(12) United States Patent
Song et al.

(10) Patent No.: US 9,411,512 B2
(45) Date of Patent: Aug. 9, 2016

(54) METHOD, APPARATUS, AND MEDIUM FOR EXECUTING A FUNCTION RELATED TO INFORMATION DISPLAYED ON AN EXTERNAL DEVICE

(71) Applicant: Samsung Electronics Co., Ltd., Gyeonggi-do (KR)

(72) Inventors: Se-Jun Song, Seoul (KR); Ji-Hyun Kim, Gyeonggi-do (KR); Young-Eun Han, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/325,508

(22) Filed: Jul. 8, 2014

(65) Prior Publication Data

US 2015/0015508 A1    Jan. 15, 2015

(30) Foreign Application Priority Data

Jul. 12, 2013  (KR) .................. 10-2013-0082516

(51) Int. Cl.
| | |
|---|---|
| *G06F 3/041* | (2006.01) |
| *G06F 3/0488* | (2013.01) |
| *G06F 3/0481* | (2013.01) |
| *G06F 3/0482* | (2013.01) |
| *G06F 9/44* | (2006.01) |

(52) U.S. Cl.
CPC ............ *G06F 3/04886* (2013.01); *G06F 3/041* (2013.01); *G06F 3/0482* (2013.01); *G06F 3/0488* (2013.01); *G06F 3/04817* (2013.01); *G06F 9/4445* (2013.01)

(58) Field of Classification Search
CPC .................................................. G06F 3/04886
See application file for complete search history.

(56) References Cited

U.S. PATENT DOCUMENTS

| | | | | |
|---|---|---|---|---|
| 4,431,265 | A  * | 2/1984 | Benton ................. | G02B 27/26 348/51 |
| 8,269,719 | B1 * | 9/2012 | Kim ..................... | G06F 3/0481 345/156 |
| 8,487,870 | B1 * | 7/2013 | Kim ..................... | G06F 3/0481 345/156 |
| 8,497,837 | B1 * | 7/2013 | Kim ..................... | G06F 3/0481 345/156 |
| 8,558,789 | B2 * | 10/2013 | Kim ..................... | G06F 3/0481 345/156 |
| 8,558,790 | B2 * | 10/2013 | Kim ..................... | G06F 3/0231 345/156 |
| 8,884,874 | B1 * | 11/2014 | Kim ..................... | G06F 3/017 345/156 |
| 8,965,314 | B2 * | 2/2015 | Jeong ................ | H04N 21/4126 455/151.1 |
| 2005/0174489 | A1 | 8/2005 | Yokoyama et al. | |
| 2008/0094368 | A1 * | 4/2008 | Ording ................ | G06F 3/0488 345/173 |
| 2008/0150921 | A1 * | 6/2008 | Robertson ............ | G06F 3/0481 345/204 |
| 2011/0087990 | A1 * | 4/2011 | Ng ....................... | G06F 3/04886 715/773 |

(Continued)

FOREIGN PATENT DOCUMENTS

KR    10-2010-0033716 A    3/2010

*Primary Examiner* — Patrick F Marinelli
(74) *Attorney, Agent, or Firm* — Cha & Reiter, LLC.

(57) ABSTRACT

A method for controlling an electronic device is provided, including displaying at least one portion of a screen displayed on a first display unit of a first electronic device on a second display unit of a second electronic device, receiving an input related to a first position in the second display unit; identifying a type of an object corresponding to the first position, and executing at least one function based on the type of the object.

3 Claims, 30 Drawing Sheets

(56) References Cited

U.S. PATENT DOCUMENTS

| | | | |
|---|---|---|---|
| 2011/0251895 A1* | 10/2011 | Bladel | G06F 17/30882 705/14.54 |
| 2011/0275391 A1* | 11/2011 | Lee | H04M 1/7253 455/500 |
| 2012/0038678 A1* | 2/2012 | Hwang | G06F 3/1454 345/667 |
| 2012/0038679 A1* | 2/2012 | Yun | G06F 3/1454 345/667 |
| 2012/0070085 A1* | 3/2012 | Arn | H04N 7/185 382/173 |
| 2012/0109836 A1* | 5/2012 | Chen | G06Q 10/10 705/319 |
| 2012/0317288 A1* | 12/2012 | Campana | G06F 17/30017 709/225 |
| 2013/0027289 A1* | 1/2013 | Choi | G06F 3/14 345/156 |
| 2013/0205219 A1* | 8/2013 | Moha | G06F 3/04842 715/748 |
| 2013/0232437 A1* | 9/2013 | Kim | G06F 3/0231 715/773 |
| 2013/0308922 A1* | 11/2013 | Sano | H04N 21/4316 386/245 |
| 2013/0332512 A1* | 12/2013 | Roman | G06F 3/0481 709/203 |
| 2014/0002389 A1* | 1/2014 | Kim | G06F 3/1446 345/173 |
| 2014/0009394 A1* | 1/2014 | Lee | H04N 5/4403 345/157 |
| 2014/0026068 A1* | 1/2014 | Park | G06F 3/0482 715/748 |
| 2014/0075377 A1* | 3/2014 | Kang | G06F 3/04842 715/788 |
| 2014/0078022 A1* | 3/2014 | Dusterhoff | G06F 3/1423 345/3.1 |
| 2014/0089847 A1* | 3/2014 | Seo | G06F 3/04842 715/800 |
| 2014/0157161 A1* | 6/2014 | Hunt | G06F 3/04847 715/768 |
| 2014/0229847 A1* | 8/2014 | Park | G06F 1/1684 715/744 |
| 2014/0340336 A1* | 11/2014 | Jung | G06F 3/0488 345/173 |
| 2015/0009096 A1* | 1/2015 | Lee | G06F 3/1462 345/2.2 |
| 2015/0015508 A1* | 1/2015 | Song | G06F 3/04886 345/173 |
| 2015/0040031 A1* | 2/2015 | Lee | G06F 17/3089 715/748 |
| 2015/0065056 A1* | 3/2015 | Won | G06F 3/1462 455/41.3 |
| 2015/0065100 A1* | 3/2015 | Arn | H04N 7/185 455/414.1 |

\* cited by examiner

METHOD, APPARATUS, AND MEDIUM FOR EXECUTING A FUNCTION RELATED TO INFORMATION DISPLAYED ON AN EXTERNAL DEVICE

CLAIM OF PRIORITY

This application claims the benefit under 35 U.S.C. §119 (a) of a Korean Patent Application filed in the Korean Intellectual Property Office on Jul. 12, 2013 and assigned Serial No. 10-2013-0082516, the entire disclosure of which is incorporated herein by reference.

BACKGROUND

1. Field of the Disclosure

The present disclosure relates generally to electronic devices, and more particularly, to a mobile device for executing a function related to information displayed on an external device, a method for executing a function related to information displayed on an external device in a mobile device, and a computer-readable recording medium thereof.

2. Description of the Related Art

In recent years, due to an increase in the number of various services and add-ons provided by mobile devices or portable devices (for example, smart phones), many mobile devices provide a Graphic User Interface (GUI) that uses a touch screen. In order to increase the usefulness of the mobile devices and meet the various needs of users, a variety of applications, which are executable in the mobile devices, have been developed.

Conventionally, in order to remotely search for information displayed on a screen of an external device (for example, a smart Television (TV) or a Personal Computer (PC)), a user may use a remote controller with four-direction buttons. For example, when using a pointer displayed on a screen of an external device to select a specific area on the screen of the external device, the user needs to shift the pointer up to the specific area by alternately selecting the four-direction buttons on the remote controller several times, and choose a Select button on the remote controller in the specific area so that information linked to the specific area may be displayed on the screen of the external device.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. In accordance with one aspect of the disclosure, a method is provided for controlling an electronic device, comprising: displaying at least one portion of a screen displayed on a first display unit of a first electronic device on a second display unit of a second electronic device; receiving an input related to a first position in the second display unit; identifying a type of an object corresponding to the first position; and executing at least one function based on the type of the object.

In accordance with another aspect of the disclosure, a method is provided for controlling an electronic device, comprising: displaying at least a portion of a screen displayed on a display unit of a first electronic device on a display unit of a second electronic device, wherein the displayed portion includes an image; receiving a user input selecting the image; responsive to the user input, displaying by the second electronic device at least one user interface component for invoking an image-related function; and processing the image with the image-related function when the user interface component is activated.

In accordance with yet another aspect of the disclosure, a method is provided for controlling an electronic device, comprising: displaying at least a portion of a screen displayed on a display unit of a first electronic device on a display unit of a second electronic device; performing an analysis of a web link included in the displayed portion, the analysis being performed in response to a user input received at the second electronic device; displaying by the second electronic device at least one user interface component for invoking a web link-related function, the user interface component being displayed based on a result from the analysis; and executing the web link-related function when the user interface component is activated.

In accordance with yet another aspect of the disclosure, a method is provided for controlling an electronic device, comprising: displaying at least a portion of a screen displayed on a display unit of a first electronic device on a display unit of a second electronic device; displaying, by the second electronic device, at least one user interface component for invoking a web browser-related function, the user interface component being displayed based on a received user input; and sending to the first electronic device an execution command for the web browser-related function when the user interface component is activated on the second electronic device.

In accordance with yet another aspect of the disclosure, an electronic device is provided comprising: a touchscreen configured to display at least a portion of a screen displayed by another electronic device and receive a touch input after the portion of the screen is displayed; and a controller configured to identify a type of an object displayed by the touchscreen at a location where the touch input is received and execute at least one function based on the type of the object.

In accordance with yet another aspect of the disclosure, an electronic device is provided for executing a function related to information displayed on another electronic device, comprising: a display unit configured to display at least a portion of a screen displayed on a display unit of the other electronic device, wherein the displayed portion includes an image; an input unit configured to receive input selecting the image; and a controller configured to display, in response to the input, at least one user interface component for invoking an image-related function, and execute the image-related function when the user interface component is activated.

In accordance with yet another aspect of the disclosure, an electronic device is provided for executing a function related to information displayed on another electronic device, comprising: a display unit configured to display at least a portion of a screen displayed on a display unit of the other electronic device; and a controller configured to: perform an analysis of a web link included in the displayed screen portion in response to a user input; display, on the display unit, at least one user interface component for invoking a web link-related function, the user interface component being displayed based on a result from the analysis; and execute the web link-related function when the user interface component is activated.

In accordance with yet another aspect of the disclosure, an electronic device is provided for executing a function related to information displayed on another electronic device, comprising: a display unit configured to display at least a portion of a screen displayed on a display unit of the other electronic device; and a controller configured to: display, on the display unit, at least one user interface component for invoking a web browser-related function, the user interface component being displayed based on a received user input; and send to the first electronic device an execution command for the web browser-related function when the user interface component is activated.

Other aspects, advantages, and salient features of the disclosure will become apparent to those skilled in the art from the following detailed description.

BRIEF DESCRIPTION OF THE DRAWINGS

The above and other aspects, features and advantages of certain aspects of the present disclosure will be made more clear by the following description taken in conjunction with the accompanying drawings, in which.

Throughout the drawings, like reference numerals will be understood to refer to like parts, components, and structures.

DETAILED DESCRIPTION

Figure 1A:
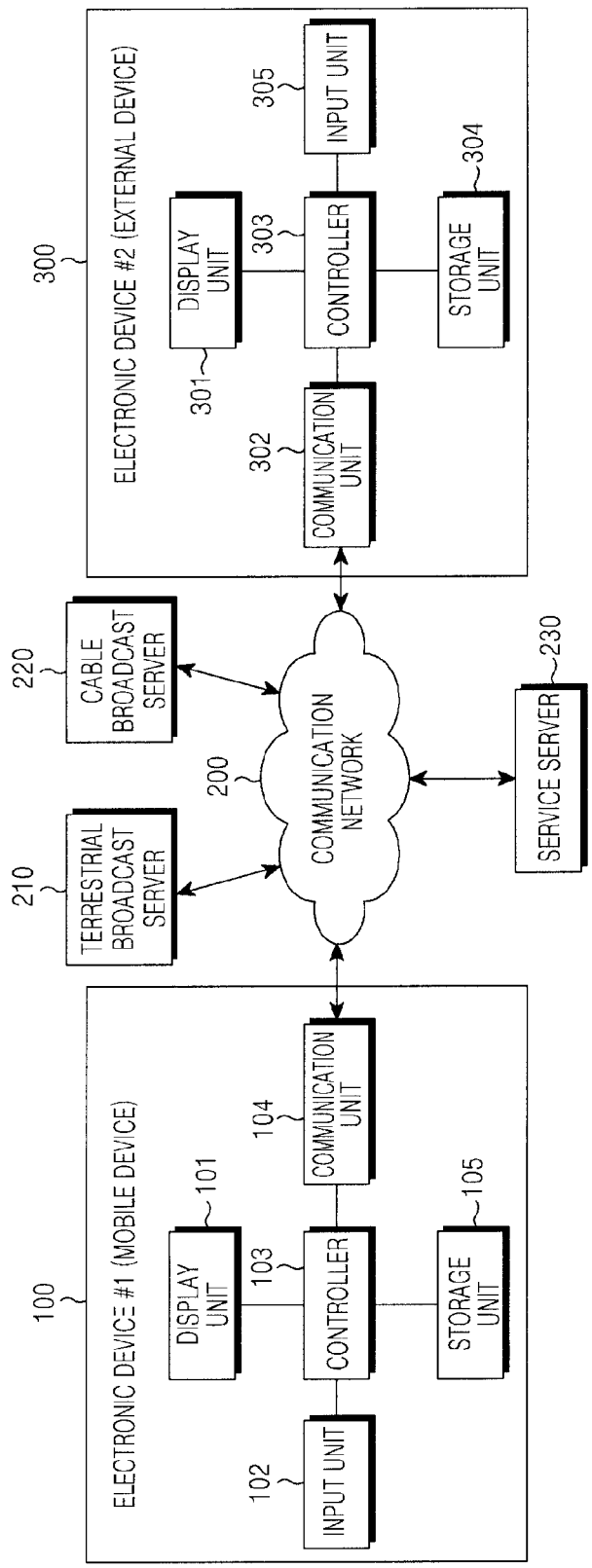
FIG. 1A is a block diagram illustrating a schematic structure of a system including electronic devices according to aspects of the present disclosure.

The following description with reference to the accompanying drawings is provided to assist a person of ordinary skill in the art with a comprehensive understanding of the disclosure. The description includes various specific details to assist in that understanding but these are to be regarded as merely exemplary for illustrative purposes. Accordingly, those of ordinary skill in the art will recognize that various changes and modifications of the examples described herein can be made without departing from the disclosure. In addition, descriptions of well-known functions and constructions may be omitted for clarity and conciseness when their inclusion may obscure an artisan's appreciation of the subject matter of the present disclosure. Accordingly, it should be apparent to those skilled in the art that the following examples are provided for illustrative purposes only and not for the purpose of limiting the disclosure. Throughout the specification, like reference numerals refer to like elements.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Descriptions shall be understood as to include any and all combinations of one or more of the associated listed items when the items are described by using the conjunctive term "~ and/or ~," or the like.

The terminology used herein is for the purpose of describing particular examples only and is not intended to be limiting of the disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In accordance with one example, an apparatus and method are disclosed for displaying at least some areas of a screen displayed on a second electronic device (referred to as an 'external device') on a display unit of a first electronic device (referred to as a 'mobile device'), and executing a function related to the displayed screen in the second electronic device by means of the first electronic device.

For a better understanding of the present disclosure, the first electronic device will be referred to as a 'mobile device' and the second electronic device will be referred to as an 'external device'. In the below-described examples, the term 'mobile device' does not necessarily mean the easy-to-carry devices, and any electronic device may be applied to the present disclosure as a mobile device as long as it has a display means and a communication means. In other words, an apparatus and method for executing various functions related to a screen displayed on an external device according to various examples of the present disclosure may be implemented in any electronic device equipped with a display means (for example, a touch screen and the like), and any electronic device that can display at least some areas of a screen displayed on the external device on its display means and install a predetermined application for executing various functions related to the displayed screen, may belong to the mobile device to which techniques presented throughout the present disclosure are applicable.

In the below-described examples of the present disclosure, the term 'external device' does not necessarily mean the device that is located outside spatially, and may refer to a separate device independent of the mobile device and is used to distinguish the external device from the mobile device. Likewise, therefore, any electronic device may be applied to the present disclosure as an external device as long as it has a display means and a communication means.

In accordance with examples of the present disclosure, at least some areas of a screen displayed on a display unit of an external device may be displayed on a display unit of a mobile device. Preferably, therefore, the screen size of the mobile device may be smaller than the screen size of the external device, but the present disclosure is not limited thereto. In other words, the examples of the present disclosure may be applied in the same way regardless of screen size.

In the below-described various examples of the present disclosure, a mobile device and an external device may be connected to each other by means of their own communication means, and at least some areas of a screen displayed on a display unit (for example, a screen) of the external device may be displayed on a display unit of the mobile device (for example, a touch screen of a smart phone). Thereafter, various functions related to a screen displayed on the display unit of the external device may be executed by a variety of user's input actions (for example, various gestures, inputs by hard keys, inputs by soft keys, and the like).

For example, the mobile device or the external device may be any device equipped with a display means, and may include a digital camera, a smart phone, a cellular phone, a game console, a Television (TV), a display device, a car head unit, a notebook computer, a laptop computer, a tablet computer, a Personal Media Player (PMP), a Personal Digital Assistant (PDA), a navigation device, a bank's Automatic Teller Machine (ATM), a store's Point of Sales (POS), or the like. In addition, the mobile device or the external device may be a flexible device or a flexible display device.

In the following description, as an example of the external device, any TV may be applied to the present disclosure regardless of its type and shape. The present disclosure may be applied even to a smart TV, which is equipped with communication features for Internet access, and in which a predetermined application is installed. The present disclosure may be applied not only to the smart TV, but also to a common TV to which a set-top box is connected. In accordance with aspects of the present disclosure, the set-top box may be implemented to support all or some of the functions implemented in the smart TV. In the following description, the TV will be assumed as a smart TV for a better understanding of the present disclosure, but the present disclosure is not limited to the smart TV and may be applied to any TV in which a predetermined application can be installed.

The term 'application' or 'app' as used herein may refer to an application program which may be installed in an electronic device (for example, a smart phone or a smart TV), and various functions according to aspects of the present disclosure may be performed by installing and executing the application in a mobile device or an external device. A dedicated application designed to provide various functions according to aspects of the present disclosure may be used, and/or other specific applications may be used, in which the functions according to an aspects of the present disclosure are included. The application, to which the present disclosure is applicable, may be an application for driving a smart TV, and during execution of the application, the electronic device may provide a service to a user, after the user logs in by entering user information (for example, an Identifier (ID), authentication information (for example, a password) and the like).

Reference will now be made to the accompanying drawings to describe in detail aspects of the present disclosure, thereby helping those of ordinary skill in the art to easily implement the disclosure.

First, reference will be made to FIGS. 1 to 3 to describe the structures of a system and a device according to aspects of the present disclosure. Next, reference will be made to FIGS. 4 to 20 to describe in detail the procedures and implementations according to aspects of the present disclosure.

Figure 1B:
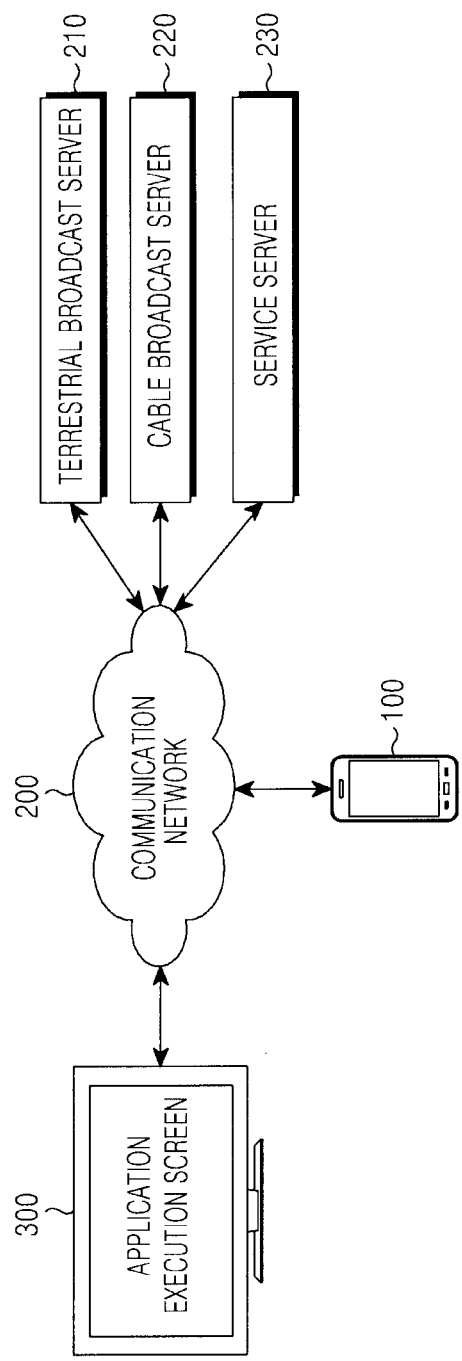
FIG. 1B illustrates examples of electronic devices according to aspects of the present disclosure.

FIGS. 1A and 1B are block diagrams illustrating a schematic structure of a system including electronic devices according to aspects of the present disclosure. Referring to FIGS. 1A and 1B, the system may include a first electronic device 100, a communication network 200, and a second electronic device 300. As described above, a mobile device may be used as an example of the first electronic device 100, and an external device may be used as an example of the second electronic device 300. The first electronic device 100 or the second electronic device 300 may be connected to a service server 230 by means of the communication network 200, and may receive a variety of web content from the service server 230. The first electronic device 100 or the second electronic device 300 may display broadcast video by receiving broadcast data from a terrestrial broadcast server 210 or a cable broadcast server 220 over the communication network 200.

In accordance with aspects of the present disclosure, if the second electronic device 300 is a TV, it may be a smart TV (or a digital TV), which can be connected to the communication network 200 and in which an application may be installed and executed, or may be a common TV to which a set-top box is connected. The second electronic device 300 (for example, a smart TV) may display broadcast video by receiving broadcast information from the terrestrial broadcast server 210 or the cable broadcast server 220 over the communication network 200.

In accordance with aspects of the present disclosure, if an application installed in the second electronic device 300 is executed, an application execution screen may be displayed on a TV screen together with a broadcast screen in a half mode or a semi-transparent mode, as illustrated in FIG. 1B.

If a web browser is executed by the application installed in the second electronic device 300, the second electronic device 300 may receive web page information from the service server 230 and display the web page on the TV screen.

The communication network 200 may be configured regardless of its communication mode such as a wired mode and a wireless mode, and may be configured in various types of communication networks such as a Personal Area Network (PAN), a Local Area Network (LAN), a Metropolitan Area Network (MAN), a Wide Area Network (WAN) and the like. The communication network 200 may be the known World Wide Web (WWW), and may use wireless transmission technology, which is used for short-range communication, such as Infrared Data Association (IrDA) and Bluetooth. The communication network 200 may include a cable broadcasting communication network, a terrestrial broadcasting communication network and a satellite broadcasting communication network, via which the first electronic device 100 or the second electronic device 300 may receive broadcast signals.

In accordance with aspects of the present disclosure, upon request for a web page from the first electronic device 100 or the second electronic device 300, the service server 230 may provide the associated web content.

The first electronic device 100 may include a display unit 101, an input unit 102, a controller 103, and a communication unit 104, and may further include a storage unit 105. In accordance with aspects of the present disclosure, the display unit 101 may receive and display at least some areas of a screen displayed on a display unit 301 of the second electronic device 300. In accordance with aspects of the present disclosure, if at least some areas of the screen displayed on the display unit 301 of the second electronic device 300 is displayed on the display unit 101, the input unit 102 performs a function of receiving a user input, and a variety of input means may be included in the input unit 102. Therefore, in accordance with aspects of the present disclosure, various functions related to the screen displayed on the display unit 101 may be executed depending on the input signal received through the input unit 102.

The communication unit 104, which performs communication with the second electronic device 300 over the communication network 200, may receive information about the screen displayed on the display unit 301 from the second electronic device 300, or transmit execution information of the function related to the screen selected in accordance with aspects of the present disclosure, to the second electronic device 300.

The controller 103 may control the function units of the first electronic device 100, and may provide various functions according to aspects of the present disclosure. The controller 103 may install a predetermined application for performing the functions according to aspects of the present disclosure, and perform a function of executing the installed application. The detailed functions of the controller 103, which are provided according to aspects of the present disclosure, will be described below.

The storage unit 105 may store information about the application executed by the controller 103, and may also store information about the screen provided from the second electronic device 300.

Figure 2A:
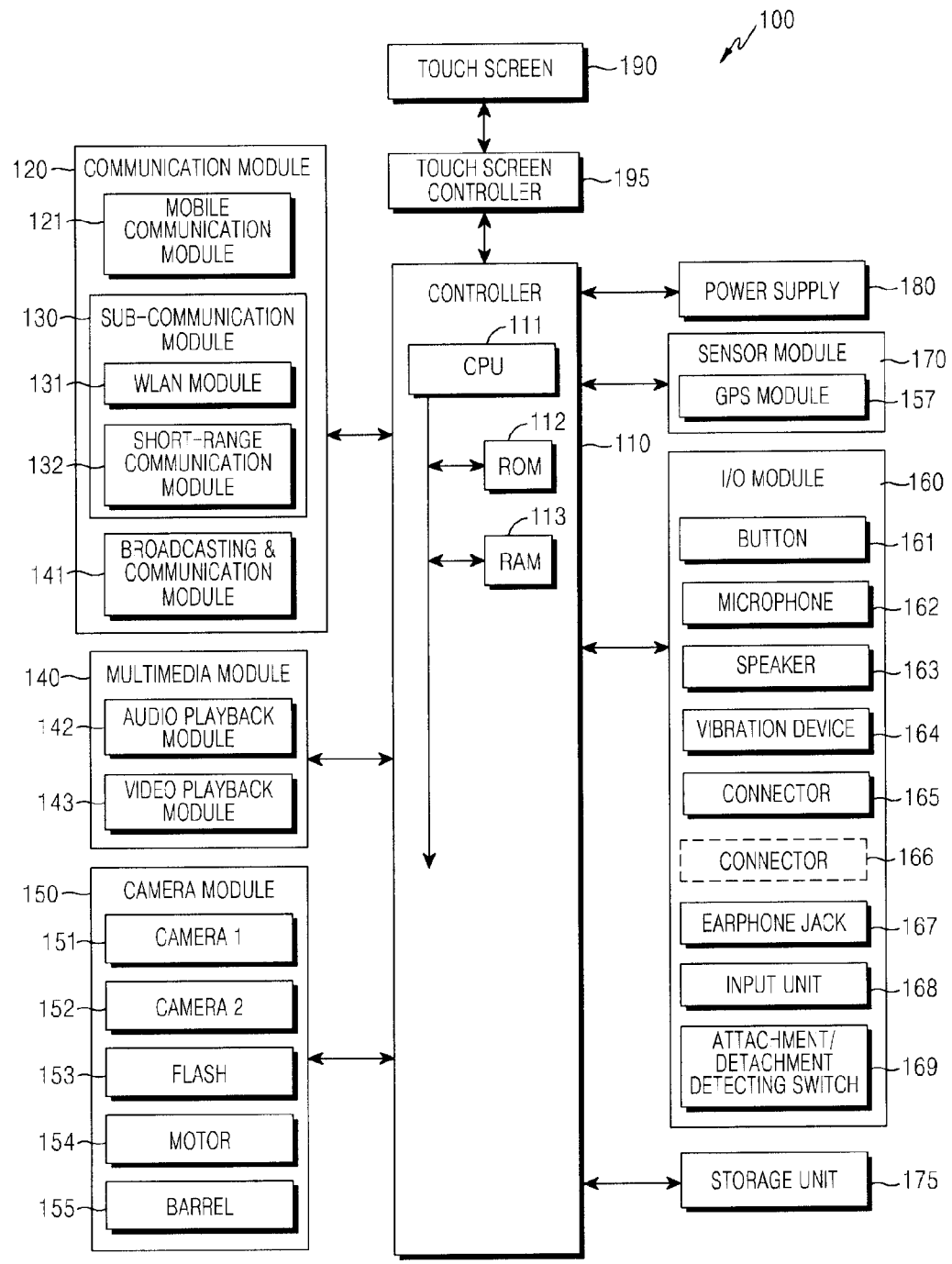
FIG. 2A is a schematic block diagram illustrating an example of a mobile device as a first electronic device according to aspects of the present disclosure.
Figure 2B:
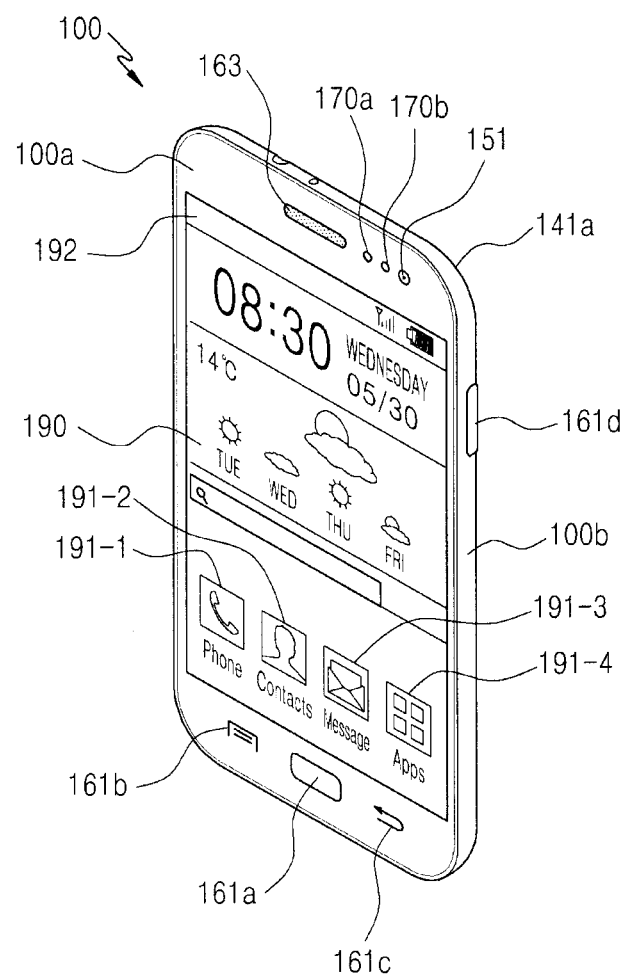
FIG. 2B is a front perspective view of a mobile device according to aspects of the present disclosure.
Figure 2C:
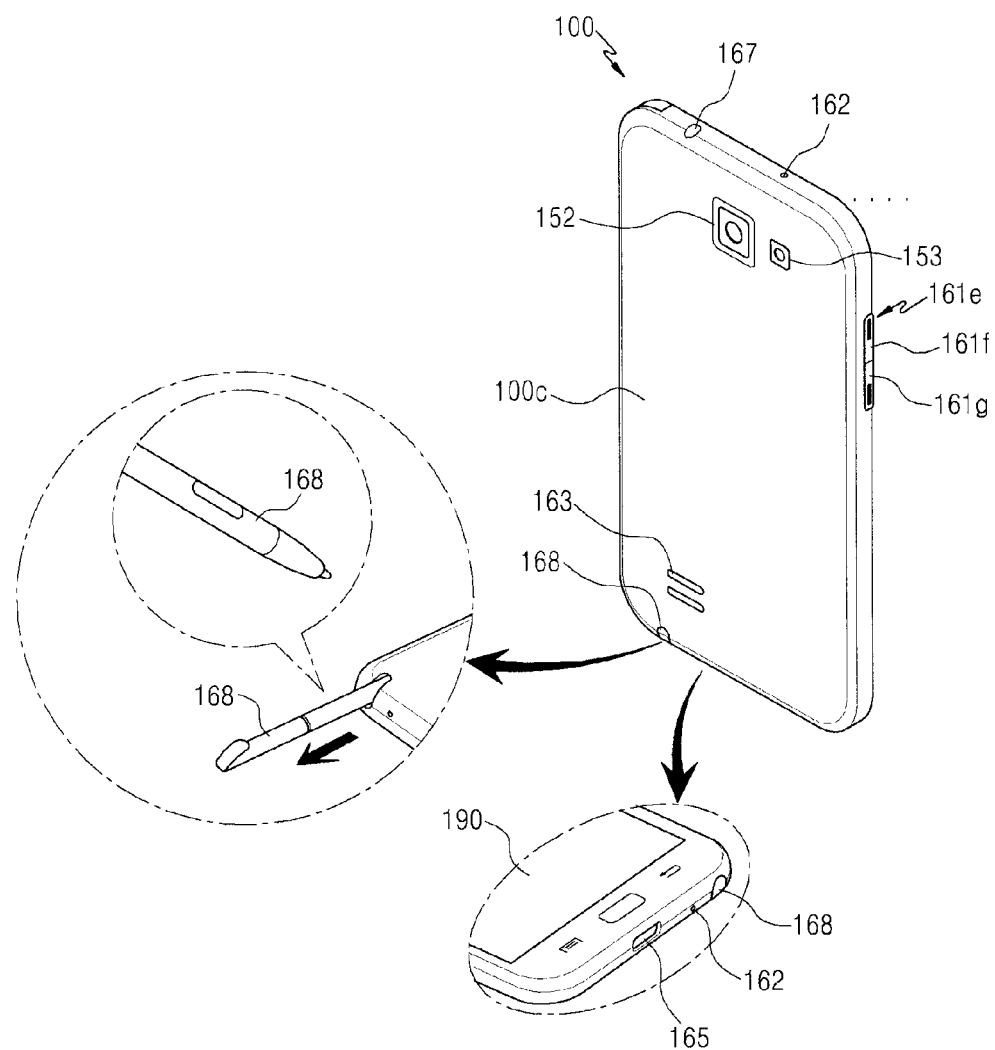
FIG. 2C is a rear perspective view of a mobile device according to aspects of the present disclosure.

The typical structure of the first electronic device is for a mobile device (for example, a cellular phone, a smart phone and the like), and in the typical structure of the first electronic device, some components may be omitted or modified, if necessary. Reference will now made to FIGS. 2A to 2C to describe a structure of a mobile device as an example of the first electronic device, to which the present disclosure is applicable.

FIG. 2A is a schematic block diagram illustrating another example of a mobile device as a first electronic device according to aspects of the present disclosure.

Referring to FIG. 2A, a first electronic device 100 may be connected to an external electronic device (for example, a second electronic device 300) using at least one of a communication module 120, a connector 165 and an earphone jack 167. The first electronic device 100 may include at least one of a variety of devices which are connectable thereto by wire, such as an earphone, an external speaker, a Universal Serial Bus (USB) memory, a charger, a cradle/dock, a Digital Multimedia Broadcasting (DMB) antenna, a mobile payment device, a health care device (for example, a blood glucose meter and the like), a game console, and a car navigation device. In addition, the first electronic device 100 may include a Bluetooth communication device, a Near Field Communication (NFC) device, a WiFi Direct communication device and a wireless Access Point (AP) device, for its wireless connection to the external electronic device. The first electronic device 100 may be connected to at least one of other mobile devices or electronic devices (for example, a cellular phone, a smart phone, a tablet PC, a desktop PC and a server) by wire or wirelessly.

The first electronic device 100 may include at least one touch screen 190 and at least one touch screen controller 195. In addition, the first electronic device 100 may include a controller 110, the communication module 120, a multimedia module 140, a camera module 150, an Input/Output (I/O) module 160, a sensor module 170, a storage unit 175, and a power supply 180. The communication module 120 may include a mobile communication module 121, a sub-communication module 130, and a broadcasting & communication module 141. The sub-communication module 130 may include at least one of a Wireless Local Area Network (WLAN) module 131 and a short-range communication module 132, and the multimedia module 140 may include at least one of an audio playback module 142 and a video playback module 143. The camera module 150 may include at least one of a first camera 151 and a second camera 152. The I/O module 160 may include at least one of a button(s) 161, a microphone 162, a speaker 163, a vibration device 164, the connector 165, and a keypad 166.

The controller 110 may include a Central Processing Unit (CPU) 111, a Read Only Memory (ROM) 112 that stores a control program for control of the first electronic device 100, and a Random Access Memory (RAM) 113 that temporarily stores signals or data received from the outside of the first electronic device 100, or can be used as a workspace for operations performed in the first electronic device 100. The CPU 111 may include a single-core CPU, a dual-core CPU, a triple-core CPU, or a quad-core CPU. The CPU 111, the ROM 112 and the RAM 113 may be connected to one another by an internal bus.

The controller 110 may control the communication module 120, the multimedia module 140, the camera module 150, the I/O module 160, the sensor module 170, the storage unit 175, the power supply 180, the touch screen 190 and the touch screen controller 195.

In accordance with aspects of the present disclosure, the controller 110 may display screen information received from the second electronic device 300 on a display unit (for example, the touch screen 190), and execute various functions related to the screen information depending on an input signal from the input unit 102 (for example, the I/O module 160). Detailed functions of the controller 110 according to aspects of the present disclosure will be described below with reference to FIG. 4.

In accordance with aspects of the present disclosure, the input of an input value may include a user input through the touch screen 190, a gesture input through the camera module 150, a switch/button input through the button 161 or the keypad 166, a voice input through the microphone 162, and the like.

The controller 110 may detect a user input event such as a hovering event, which may occur if an input unit 168 approaches the touch screen 190 or is located to approach thereto. In accordance with aspects of the present disclosure, if an object included in a screen is selected by various input means, or if a predetermined key is entered to execute a function related to the screen, the controller 110 may execute a predetermined function.

The controller 110 may detect various user inputs which are received not only through the touch screen 190 but also through the camera module 150, the I/O module 160 and the sensor module 170. The user inputs may include not only the touch input, but also various types of information entered in the first electronic device 100, such as user's gesture, voice, eye movements, iris recognition, biomedical signal and the like. The controller 110 may execute a predetermined operation or function corresponding to the detected user input in the first electronic device 100.

The controller 110 may output a control signal to the input unit 168 or the vibration device 164. The control signal may include information about a vibration pattern, and the input unit 168 or the vibration device 164 may generate vibrations corresponding to the vibration pattern. The information about a vibration pattern may represent the vibration pattern itself, an identifier of the vibration pattern, and the like. The control information may simply include only a request for generation of vibrations.

Depending on its performance, the first electronic device 100 may include at least one of the mobile communication module 121, a WLAN module 131, and the short-range communication module 132.

The mobile communication module 121, under control of the controller 110, may connect the first electronic device 100 to the external electronic device by mobile communication using at least one or multiple antennas. The mobile communication module 121 may exchange wireless signals for voice calls, video calls, Short Message Service (SMS) messages or Multimedia Messaging Service (MMS) messages, with cellular phones, smart phones, tablet PCs or other electronic devices, phone numbers of which are stored or registered in the first electronic device 100.

The sub-communication module 130 may include at least one of the WLAN module 131 and the short-range communication module 132. For example, the sub-communication module 130 may include both or any one of the WLAN module 131 and the short-range communication module 132.

The WLAN module 131, under control of the controller 110, may be connected to the Internet in the place where a wireless AP is installed. The WLAN module 131 may support the WLAN standard IEEE 802.11x proposed by the Institute of Electrical and Electronic Engineers (IEEE). The short-range communication module 132, under control of the controller 110, may wirelessly perform short-range communication between the first electronic device 100 and the external electronic device. The short-range communication scheme may include Bluetooth, Infrared Data Association (IrDA), WiFi-Direct, Near Field Communication (NFC) and the like.

In accordance with aspects of the present disclosure, the first electronic device 100 may communicate with the second electronic device 300 by means of at least one of the mobile communication module 121, the WLAN module 131 and the short-range communication module 132.

The broadcasting and communication module 141, under control of the controller 110, may receive broadcast signals (for example, TV broadcast signals, radio broadcast signals, data broadcast signals or the like) and additional broadcast information (for example, Electric Program Guide (EPG) or Electric Service Guide (ESG)) transmitted from broadcasting stations via a broadcasting & communication antenna.

The multimedia module 140 may include at least one of the audio playback module 142 and the video playback module 143. The audio playback module 142, under control of the controller 110, may play digital audio files (with a file extension of, for example, mp3, wma, ogg or way) stored in the storage unit 175 or received from an external device. The video playback module 143, under control of the controller 110, may play digital video files (with a file extension of, for example, mpeg, mpg, mp4, avi, mov, or mkv) stored in the storage unit 175 or received from an external device.

The multimedia module 140 may be incorporated into the controller 110. The camera module 150 may include at least one of the first camera 151 and the second camera 152, which may capture still images or videos under control of the controller 110. In addition, the camera module 150 may include at least one of a barrel 155 for zooming in/out on a subject, a motor 154 for controlling the movement of the barrel 155, and a flash 153 for providing a second light source used to take a picture of a subject. The first camera 151 may be mounted on the front of the first electronic device 100, and the second camera 152 may be mounted on the rear of the first electronic device 100.

The I/O module 160 may include at least one of the at least one button 161, the at least one microphone 162, the at least one speaker 163, the at least one vibration device 164, the connector 165, the keypad 166, the earphone jack 167 and the input unit 168. The I/O module 160 is not limited thereto, and may include a cursor controller such as a mouse, a trackball, a joystick, or cursor direction keys to control the movement of the cursor on the touch screen 190.

The buttons 161 may be formed on the front, side or rear of the housing (or case) of the first electronic device 100, and may include at least one of a power/lock button, a volume button, a menu button, a home button, a back button, and a search button. The microphone 162 may generate electrical audio signals by picking up voices or sounds, under control of the controller 110. The speaker 163, under control of the controller 110, may output sounds corresponding to various signals or data (for example, wireless data, broadcast data, digital audio data, digital video data and the like) to the outside of the first electronic device 100. The speaker 163 may output sounds (for example, a button manipulation tone for a phone call, a ring back tone, the other party's voice, and the like) corresponding to a function performed by the first electronic device 100. One or multiple speakers 163 may be formed in a proper position or positions of the housing of the first electronic device 100.

The vibration device 164 may convert electrical signals into mechanical vibrations under control of the controller 110. For example, the vibration device 164 may operate, if the first electronic device 100 in vibration mode receives a voice or video call from another device. One or multiple vibration devices 164 may be formed in the housing of the first electronic device 100. The vibration device 164 may operate in response to a user input from the touch screen 190.

The connector 165 may be used as an interface for connecting the first electronic device 100 to the external electronic device or the power source. The controller 110 may transmit data stored in the storage unit 175 of the first electronic device 100 to the external electronic device or receive data from the external electronic device, via a wired cable connected to the connector 165. The first electronic device 100 may receive power from the power source or charge its rechargeable battery using the power source, via the wired cable connected to the connector 165.

The keypad 166 may receive key inputs from the user for control of the first electronic device 100. The keypad 166 may include a physical keypad formed on the first electronic device 100, or a virtual keypad displayed on the touch screen 190. The physical keypad formed on the first electronic device 100 may be optional depending on the performance or the structure of the first electronic device 100. An earphone may be connected to the first electronic device 100 as its plus is inserted into the earphone jack 167.

The input unit 168 may be inserted into the first electronic device 100 and may be drawn out or separated from the first electronic device 100 during its use. In an area inside the first electronic device 100, into which the input unit 168 is inserted, may be mounted an attachment/detachment detecting switch 169 to detect attachment/detachment of the input unit 168. The attachment/detachment detecting switch 169 may output a signal corresponding to the attachment/detachment of the input unit 168 to the controller 110. The attachment/detachment detecting switch 169 may be configured to be in direct or indirect contact with the input unit 168 during insertion of the input unit 168. Accordingly, based on whether it is in contact with the input unit 168, the attachment/detachment detecting switch 169 may generate a signal (for example, a signal for notifying the attachment or detachment of the input unit 168) corresponding to the attachment or detachment of the input unit 168, and output it to the controller 110.

The sensor module 170 may include at least one sensor for detecting the status of the first electronic device 100. For example, the sensor module 170 may include at least one of a proximity sensor for detecting whether the user is in the vicinity of the first electronic device 100, an illuminance sensor for detecting the amount of light around the first electronic device 100, a motion sensor for detecting a motion (for example, rotation, acceleration or vibration) of the first electronic device 100, a geo-magnetic sensor for detecting a point of the compass for the first electronic device 100 using the Earth's magnetic field, a gravity sensor for detecting the direction of gravity, an altimeter for detecting an altitude of the first electronic device 100 by measuring the atmospheric pressure, and a Global Positioning System (GPS) module 157.

The GPS module 157 may receive radio waves from a plurality of GPS satellites in the Earth orbit, and calculate a location of the first electronic device 100 using Time of Arrival (ToA) of the radio waves from the GPS satellites to the first electronic device 100.

The storage unit 175, under control of the controller 110, may store signals or data, which are input/output depending on operations of the communication module 120, the multimedia module 140, the camera module 150, the I/O module 160, the sensor module 170 or the touch screen 190. The storage unit 175 may store applications and a control program for control of the first electronic device 100 or the controller 110.

The term 'storage unit' as used herein may refer any data storage device such as the storage unit 175, the ROM 112 and the RAM 113 in the controller 110, and a memory card (for example, a Secure Digital (SD) card, a memory stick and the like) mounted in the first electronic device 100. The storage unit 175 may include a non-volatile memory, a volatile memory, a Hard Disk Drive (HDD) or a Solid State Drive (SDD).

The storage unit 175 may store applications with a variety of functions, such as a navigation application, a video call application, a game application and a time-based alarm application, images for providing Graphical User Interfaces (GUIs) associated with the applications, databases or data related to a method of processing user information, documents and touch inputs, background images (for example, a menu screen, a standby screen and the like) or operating programs used to drive the first electronic device 100, and images captured by the camera module 150.

In accordance with aspects of the present disclosure, the storage unit 175 may store an application capable of executing a function related to control of a screen displayed on the second electronic device 300, and images of the screen displayed on the second electronic device 300 may be stored in the storage unit 175 in various formats. Various functions related to control of the screen displayed on the second electronic device 300 may be stored in the storage unit 175 separately depending on the type of an object selected in the screen.

The storage unit 175 is a non-transitory machine machine-readable (e.g., computer-readable) medium, and the term 'machine-readable medium' may refer to a medium that provides data to a machine so that the machine may perform a specific function. The storage unit 175 may include non-volatile media and volatile media. All of these media need to be a type of media configured such that commands delivered by the media may be detected by a physical mechanism that reads the commands by the machine.

The machine-readable media may include, though not limited to, at least one of floppy disk, flexible disk, hard disk, magnetic tape, Compact Disc Read-Only Memory (CD-ROM), optical disk, punch card, paper tape, RAM, Programmable Read-Only Memory (PROM), Erasable PROM (EPROM), FLASH-EPROM, and embedded Multi Media Card (eMMC).

The power supply 180, under control of the controller 110, may supply power to one or multiple rechargeable batteries mounted in the housing of the first electronic device 100. The one or multiple rechargeable batteries supply power to the first electronic device 100. The power supply 180 may supply, to the first electronic device 100, the power which is received from the external power source through a wired cable connected to the connector 165. The power supply 180 may supply, to the first electronic device 100, the power which is wirelessly received from the external power source by wireless charging technology.

The first electronic device 100 may include at least one touch screen 190 that provides GUIs corresponding to various services (for example, call, data transmission, broadcasting, photo taking and the like) to the user. The touch screen 190 may output to the touch screen controller 195 an analog signal corresponding to at least one user input which is entered to the GUIs.

The touch screen 190 may receive at least one user input through the user's body (for example, fingers including the thumb) or the input unit 168 (for example, a stylus pen, an electronic pen and the like). The touch screen 190 may be implemented in, for example, a resistive way, a capacitive way, an infrared way, an acoustic wave way, or a combination thereof.

In some implementations, the touch screen 190 may include at least two touch panels capable of individually detecting a touch or an access of the fingertip and the input unit 168 so that the touch screen 190 may receive inputs by the fingertip and the input unit 168 separately. The at least two touch panels may provide different output values to the touch screen controller 195, and the touch screen controller 195 may differently recognize the values which are received from the at least two touch panels, and determine whether the input from the touch screen 190 is an input by the fingertip, or a input by the input unit 168.

The term 'touch' may be construed to include not only the contact touch between the touch screen 190 and the user's body or the touch input means, but also the non-contact touch between them, with a detectable gap being set to, for example, 1 mm or less. The gap, in which the touch screen 190 can detect the non-contact touch, is subject to change depending on the performance or structure of the first electronic device 100.

The touch screen controller 195 may convert analog signals received from the touch screen 190 into digital signals, and transmit them to the controller 110. The controller 110 may control the touch screen controller 190 using the digital signals received from the touch screen controller 195. The touch screen controller 195 may determine not only the user's input position but also the hovering gap or distance by detecting a value (for example, a current value or the like) output from the touch screen 190, convert the determined distance value into a digital signal (for example, Z coordinate), and provide it to the controller 110. In addition, the touch screen controller 195 may detect a pressure at which a user input means presses the touch screen 190, by detecting a value (for example, a current value or the like) output from the touch screen 190, convert the determined pressure value into a digital signal, and provide it to the controller 110.

FIG. 2B is a front perspective view of a first electronic device according to aspects of the present disclosure, and FIG. 2C is a rear perspective view of a first electronic device according to aspects of the present disclosure.

Referring to FIGS. 2B and 2C, the touch screen 190 may be disposed in the center of a front of the first electronic device 100. The touch screen 190 may be formed large to occupy most of the front of the first electronic device 100. In the example of FIG. 2B, a main home screen is displayed on the touch screen 190. The main home screen is the first screen that is displayed on the touch screen 190 when the first electronic device 100 is powered on. If the first electronic device 100 has different home screens of several pages, the main home screen may be the first home screen among the home screens of several pages. On a home screen may be displayed shortcut icons 191-1, 191-2 and 191-3 for executing the frequently used applications, a main menu switch key 191-4, the time, the weather and the like. If the user selects the main menu switch key 191-4, a menu screen may be displayed on the touch screen 190. At the top of the touch screen 190 may be formed a status bar 192 that displays the status of the first electronic device 100, such as a battery level, a received signal strength indication, the current time and the like.

Under the touch screen 190 may be formed a home button 161*a*, a menu button 161*b* and a back button 161*c*. The home button 161*a* is used to display the main home screen on the touch screen 190. For example, if the home button 161*a* is selected or pressed by the user while any home screen different from the main home screen, or a menu screen is displayed on the touch screen 190, the main home screen may be displayed on the touch screen 190. If the home button 161*a* is selected while applications are executed on the touch screen 190, the main home screen illustrated in FIG. 2B may be displayed on the touch screen 190. The home button 161*a* may also be used to display the recently used applications or a task manager on the touch screen 190.

The menu button 161*b* is used to provide a connection menu that can be displayed on the touch screen 190. The connection menu may include a widget add menu, a wallpaper change menu, a search menu, an edit menu, a preference menu and the like.

The back button 161*c* may be used to display the preceding screen, or to exit the most recently used application.

At the edge of the front of the first electronic device 100 may be disposed the first camera 151, an illuminance sensor 170*a* and a proximity sensor 170*b*. On a rear of the first electronic device 100 may be disposed the second camera 152, the flash 153 and the speaker 163.

On sides of the first electronic device 100 may be disposed, for example, a power/lock button 161*d*, a volume button 161*e* (having a volume-up button 161*f* and a volume-down button 161*g*), a terrestrial DMB antenna 141*a* for broadcast reception, one or multiple microphones 162, and the like. The DMB antenna 141*a* may be fixed to the first electronic device 100, or formed to be detachable from the first electronic device 100.

The connector 165 may be formed at the bottom of the first electronic device 100. A plurality of electrodes may be formed on the connector 165, and connected to the external device by wire. The earphone jack 167 may be formed at the top of the first electronic device 100. A plug of an earphone may be inserted into the earphone jack 167.

The input unit 168 may be mounted at the bottom of the first electronic device 100. The input unit 168 may be inserted into the first electronic device 100, and may be pulled out or separated from the first electronic device 100 during its use.

So far, the description has been made of the detailed structure of the first electronic device 100 as an example of the electronic device to which techniques presented throughout the present disclosure are applicable.

Referring back to FIG. 1A, the second electronic device 300 may include the display unit 301, a communication unit 302, and a controller 303. The second electronic device 300 may further include a storage unit 304 and an input unit 305. In accordance with aspects of the present disclosure, the display unit 301 may receive and display web pages provided from the service server 230, and broadcast videos provided from the terrestrial broadcast server 210 or the cable broadcast server 220. As described above, in accordance with aspects of the present disclosure, at least some areas of the screen displayed on the display unit 301 may be displayed even on the display unit 101 of the first electronic device 100 by being synchronized. The second electronic device 300 may receive a variety of control commands related to the displayed screen from the first electronic device 100, reflect them in the current screen, and display the resulting screen on the display unit 301.

The communication unit 302, which performs a function of communicating with the first electronic device 100 over the communication network 200, may transmit information about the screen displayed on the display unit 301 to the first electronic device 100, or receive execution information of the function related to the screen selected in accordance with aspects of the present disclosure, from the first electronic device 100.

At least one of the communication unit 302 of the second electronic device 300 and the communication unit 104 of the first electronic device 100 may receive information from the service server 230 (for example, a web server) by accessing the communication network 200 (for example, the Internet). The received information may include various types of content, such as web pages, images, videos, audios and texts. Some of the received information may include an area of a link which can be connected to other information. For example, the area of a link may be an area including a hyperlink capable of connecting with at least one of another web page, image, video, audio and text.

In accordance with aspects of the present disclosure, if one of the communication unit 302 of the second electronic device 300 and the communication unit 104 of the first electronic device 100 is connected to the Internet, the device, which is connected to the Internet and receives information from the service server 230, may retransmit the information to the device which is not connected to the Internet. In this case, the communication unit 302 of the second electronic device 300 and the communication unit 104 of the first electronic device 100 may perform synchronization so that the information may be displayed on the display unit 301 of the second electronic device 300 and the display unit 101 of the first electronic device 100 almost at the same time. In another aspect, if both of the communication unit 302 of the second electronic device 300 and the communication unit 104 of the first electronic device 100 are connected to the Internet, both of the second electronic device 300 and the first electronic device 100 may receive the same information from the Internet. The information each device has received may be displayed on the display unit 301 of the second electronic device 300 and the display unit 101 of the first electronic device 100. In this case, the communication unit 302 of the second electronic device 300 and the communication unit 104 of the first electronic device 100 may perform synchronization so that the information may be displayed on the display unit 301 of the second electronic device 300 and the display unit 101 of the first electronic device 100 almost at the same time.

The controller 303, which controls the function units of the second electronic device 300, may control them to provide a variety of functions according to aspects of the present disclosure. The controller 303 may install a predetermined application for performing functions according to aspects of the present disclosure, and perform a function of executing the installed application. In other words, the controller 303 may control the overall operation for the components of the second electronic device 300. The controller 303 may read a program in the storage unit 304, and control an operation for each component of the second electronic device 300 based on the read results. The controller 303 may include an Internet browser module. The Internet browser module may perform a function of searching for or managing information provided over the communication network 200 (for example, the Internet). For example, the Internet browser module makes it possible to browse information from the service server 230 (for example, a web server) to which the second electronic device 300 is connected over the Internet. The Internet browser module may perform a function of opening a web page, providing a list of recently visited Internet addresses or Uniform Resource Locators (URLs), memorizing and managing the frequently visited Internet addresses, storing and printing a web page, and the like. Detailed functions of the controller 303 according to aspects of the present disclosure will be described below.

A typical structure of the second electronic device 300 (for example, an external device) may be for a TV (for example, a smart TV, a digital TV or the like), and in the typical structure of the second electronic device, some components may be omitted or modified, if necessary. Reference will now made to FIG. 3 to describe a structure of a TV as an example of the second electronic device, to which the present disclosure is applicable. FIG. 3 is a block diagram illustrating a detailed structure of a TV as a second electronic device (or an external device) according to aspects of the present disclosure. Referring to FIG. 3, the second electronic device 300 according to aspects of the present disclosure may include a broadcast signal receiver 310, a data communication Interface (I/F) unit 320, a main controller 330, an application processor 340, an Internet access processor 350, a TV video configuration unit 360, and a TV control screen generator 370.

The broadcast signal receiver 310, which receives a variety of broadcast data transmitted from the outside, may perform a function of, for example, receiving a terrestrial broadcast signal, receiving a cable broadcast signal, receiving an Internet Protocol TV (IPTV) broadcast signal, receiving a satellite broadcast signal, and the like. Therefore, the broadcast signal receiver 310 may include a cable TV receiver, an IPTV receiver, a satellite broadcasting receiver, and the like.

For example, the cable TV receiver in the broadcast signal receiver 310 may demodulate a cable TV signal. The demodulated data is comprised of compressed video, audio and additional information. Video raw data may be generated by performing MPEGx/H.264 decompression on the compressed video. Audio raw data may be generated by performing MPEGx/AC3/AAC decompression on the compressed audio. In addition, the additional information may be transmitted to the main controller 330. The received broadcast signal may be transmitted to a display unit 380 through the TV video configuration unit 360, and displayed on the screen.

The IPTV receiver in the broadcast signal receiver 310 may receive IPTV data over the Internet, and the IPTV data may be comprised of compressed video, audio and additional information. Similarly, video raw data may be generated by performing MPEGx/H.264 decompression on the compressed video. Audio raw data may be generated by performing MPEGx/AC3/AAC decompression on the compressed audio. In addition, the additional information may be transmitted to the main controller 330.

The data communication I/F unit 320, which is a data communication channel for performing data communication apart from reception of TV broadcast content received from the broadcast signal receiver 310, may perform data communication with the service server 230 over the communication network 200 according to aspects of the present disclosure. In addition, the data communication I/F unit 320 may perform data communication with the first electronic device 100 over the communication network 200 according to aspects of the present disclosure.

In accordance with aspects of the present disclosure, the main controller 330 may transmit the full screen displayed on the display unit 380 or at least some areas selected from the full screen, to the first electronic device 100 through the data communication I/F unit 320. The main controller 330 may perform a function related to the screen displayed on the display unit 380 depending on a control signal transmitted from the first electronic device 100.

Upon receiving a select signal for execution of an application from the user, the main controller 330 may execute the application by controlling the application processor 340. In addition, the main controller 330 may control changing of TV settings such as TV channel change and volume control, control Internet access, and control a variety of applications installed in the second electronic device 300.

The TV video configuration unit 360 may configure video to be displayed on a TV screen, including the broadcast video data, and provide it to the display unit 380.

When the second electronic device 300 performs Internet access with the service server 230 for execution of the application according to aspects of the present disclosure, the Internet access processor 350 may perform a function of controlling the Intern access. The Internet access processor 350 may generate an Internet display area or an application execution screen apart from the broadcast screen area on the screen of the second electronic device 300, thereby providing a variety of information. By providing a web browser function, the Internet access processor 350 may display a web page received from the service server 230 on the display unit 380.

The application processor 340 may process various functions associated with execution of the application installed in accordance with aspects of the present disclosure. For example, if the second electronic device 300 is synchronized with the first electronic device 100 and the screen is shared in real time by the execution of the application, the application processor 340 may transmit information about the full screen being displayed on the display unit 380 or at least some areas selected from the full screen, to the first electronic device 100.

Upon receiving a function execution command associated with the screen being displayed, from the first electronic device 100, while a specific web pate screen is displayed on the display unit 380, the application processor 340 may perform a function related to the screen.

The TV control screen generator 370 may generate on the display unit 380 a separate control display area for TV channel change, volume control, settings change, and the like. The TV video configuration unit 360 generates a TV display area by combining the display areas provided from the broadcast signal receiver 310, the application processor 340 and the TV control screen generator 370 in the form set by the user. In other words, the TV display area may be divided into, for example, a TV display area, an Internet display area, an application execution display area, a control display area and the like, and these areas may partially overlap. As to the form in which the display areas are combined, a display screen for TV output may be generated by scaling up and down each display area independently depending on the user's preference, or a TV display screen may be generated by transparentizing or semi-transparentizing a specific display area.

Figure 3:
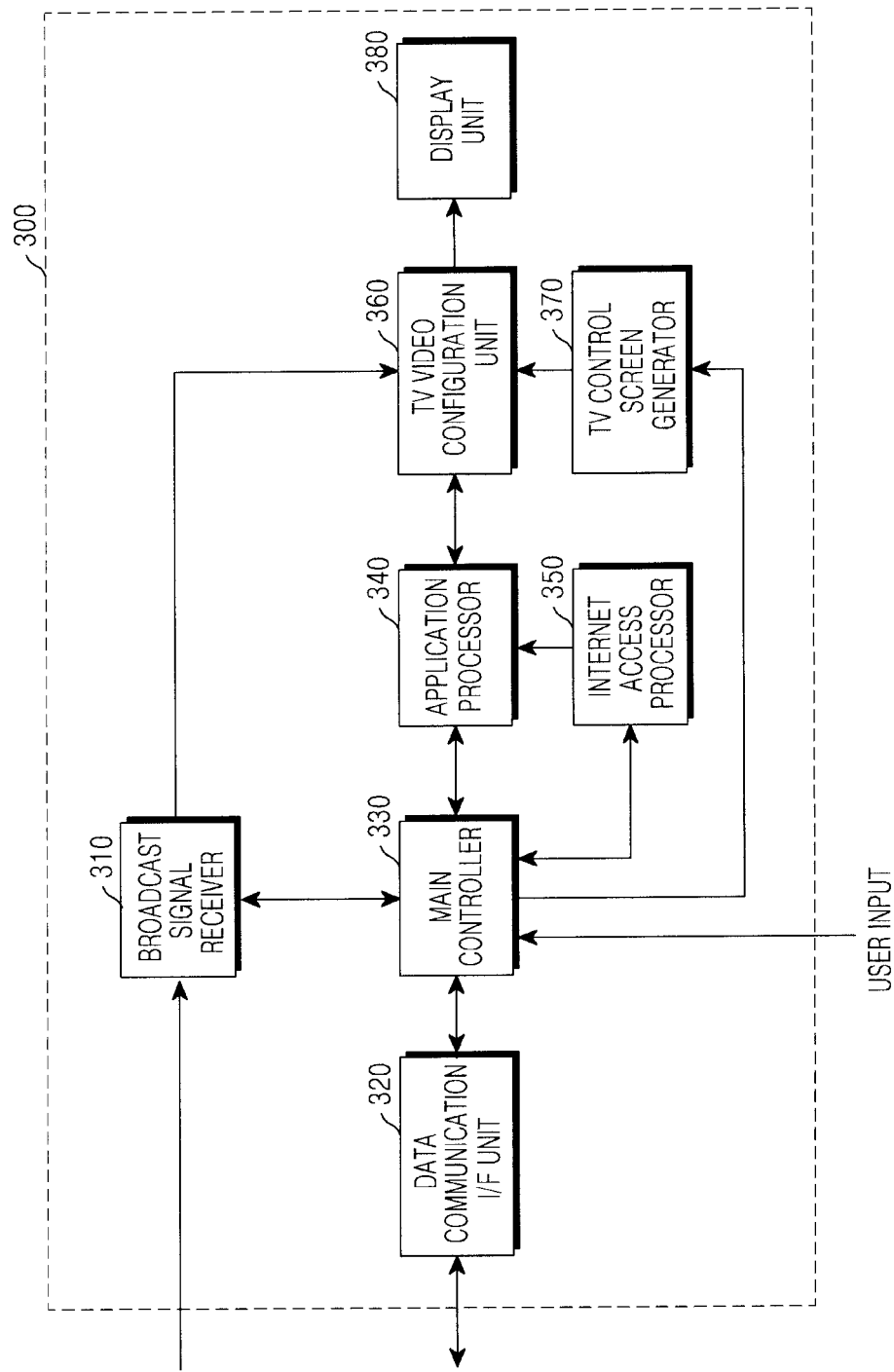
FIG. 3 is a block diagram illustrating a detailed structure of a TV as a second electronic device (or an external device) according to aspects of the present disclosure.

The components of the first electronic device 100 and the second electronic device 300 described in conjunction with FIGS. 2 and 3 are illustrated as separate components to show that they may be separated functionally and logically, and it is not meant that they need to be separate physical components or be implemented as separate code.

The term 'function unit' as used herein may refer to a functional and structural combination of hardware for performing the technical idea of the present disclosure and software for driving the hardware. For example, the function unit may refer to a logical unit of predetermined code and hardware resources by which the predetermined code may be performed, and it will be apparent to those of ordinary skill in the art that the function unit does not necessarily mean the physically connected code, or does not mean one type of hardware.

So far, the detailed description has been made of the detailed structures of the first electronic device 100 and the second electronic device 300 constituting the system proposed by the present disclosure. Reference will now be made to FIGS. 4 to 20 to describe in detail a method of executing a function related to information displayed on an external device by mobile devices according to aspects of the present disclosure.

First, reference will be made to FIG. 4 to describe methods of searching for a screen displayed on an external device. Next, reference will be made to FIGS. 5 to 20 to describe methods of performing a function related to a screen according to aspects of the present disclosure.

In the following description, the user's gestures used as input methods through the input unit 102 of the first electronic device 100 may be, for example, user's actions to display or control information on the touch screen using the finger (particularly, the index finger) or the thumb of the left and right hands. For example, the gestures may include actions such as touch, release, rotate, pinch, spread, touch drag, flick, swipe, touch-and-hold, tap, double tap, drag, drag-and-drop, multi-swipes, shake, rotate and the like. The term 'touch' as used herein may be construed to include not only the physical contact between the touch screen and the finger, but also the contactless close approach between the touch screen and the finger.

Figure 4:
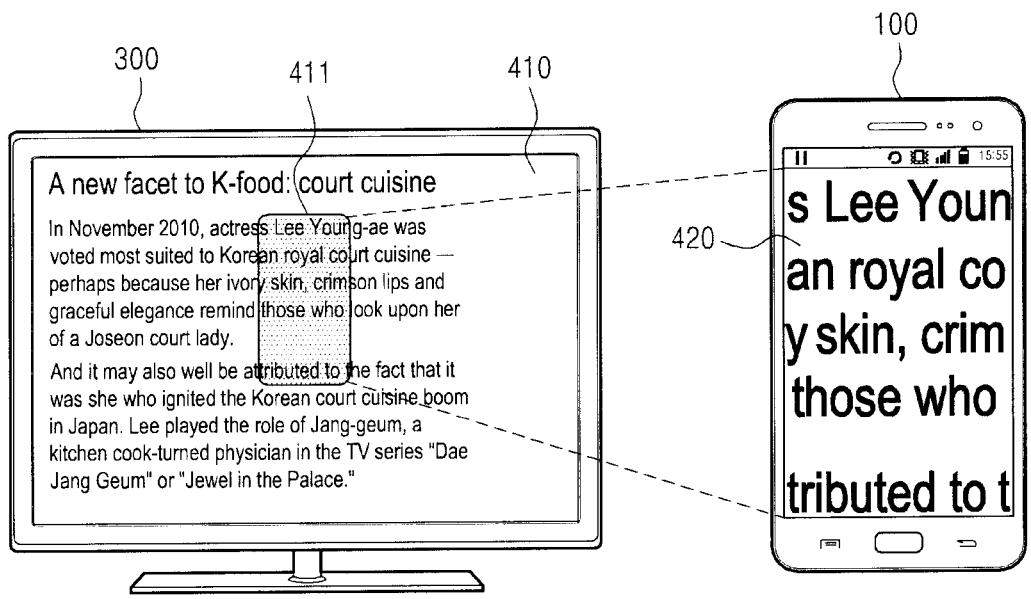
FIG. 4 illustrates the concept of displaying at least some areas of a screen of an external device on a mobile device according to aspects of the present disclosure.

FIG. 4 illustrates the concept of displaying at least some areas of a screen of an external device on a mobile device according to aspects of the present disclosure. Referring to FIG. 4, at least some areas 411 of a full screen 410 of the second electronic device (hereinafter referred to as an 'external device') 300 may be displayed in the same way on a screen 420 of the first electronic device (hereinafter referred to as a 'mobile device') 100.

A method of executing a function related to information displayed on an external device in a mobile device or a method of executing a function related to displayed information in the external device by means of the mobile device according to aspects of the present disclosure, may be implemented as one or more processor-executable instructions recorded on a non-transitory medium, in hardware (e.g., as digital logic implemented by an FPGA) or other circuitry, or as a combination of hardware and software. The computer-readable medium may include program commands, data files, data structures and the like independently or in combination. The program commands recorded in the medium may be program commands designed and constructed especially for the disclosure, or may be known to those skilled in the art of the computer software. Examples of the computer-readable recording medium may include magnetic media such as hard disk, floppy disk and magnetic tape; optical media such as CD-ROM and Digital Versatile Disk (DVD); magneto-optical media such as floptical disk; and hardware devices specially configured to store and perform program commands, such as ROM, RAM and flash memory. Examples of the program commands may include not only the machine code such as code made by a compiler, but also the high-level language code that can be executed by a computer using an interpreter or the like. The hardware devices may be configured to operate as one or more software modules to perform the operation of the present disclosure, and vice versa.

Reference will now be made to FIGS. 5 to 20 to describe in detail screen control methods according to various aspects of the present disclosure.

Figure 5:
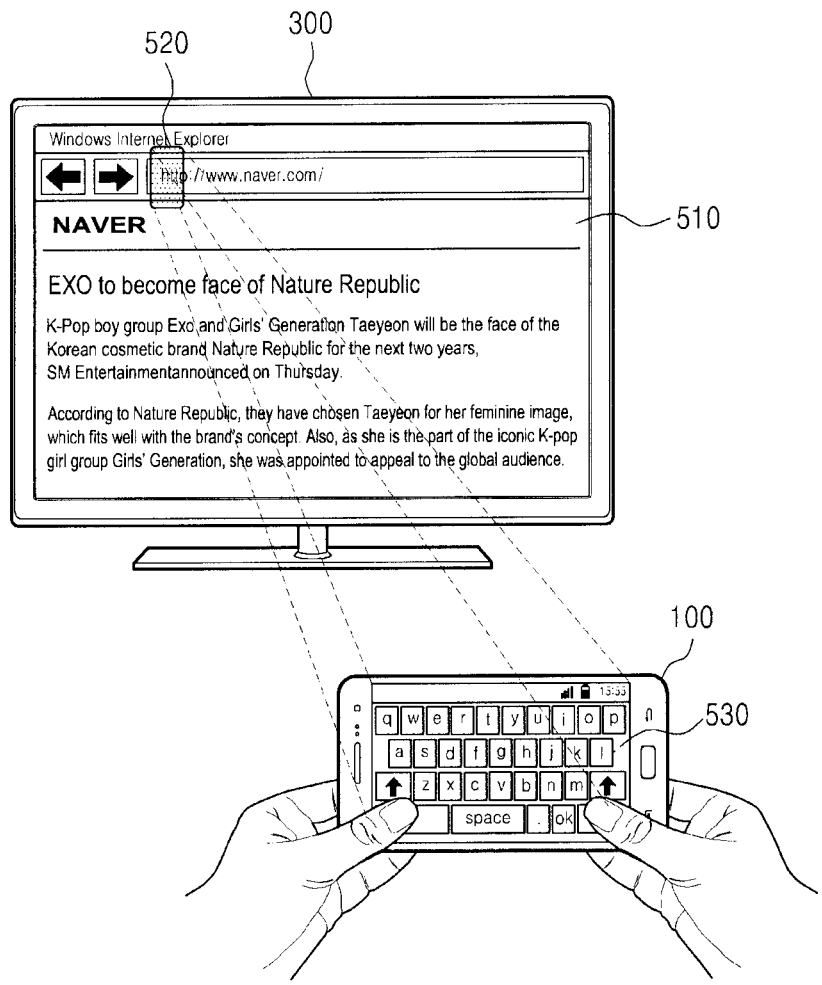
FIG. 5 illustrates an example of entering a text in a text editing area of an external device by means of a mobile device according to aspects of the present disclosure.
Figure 13:
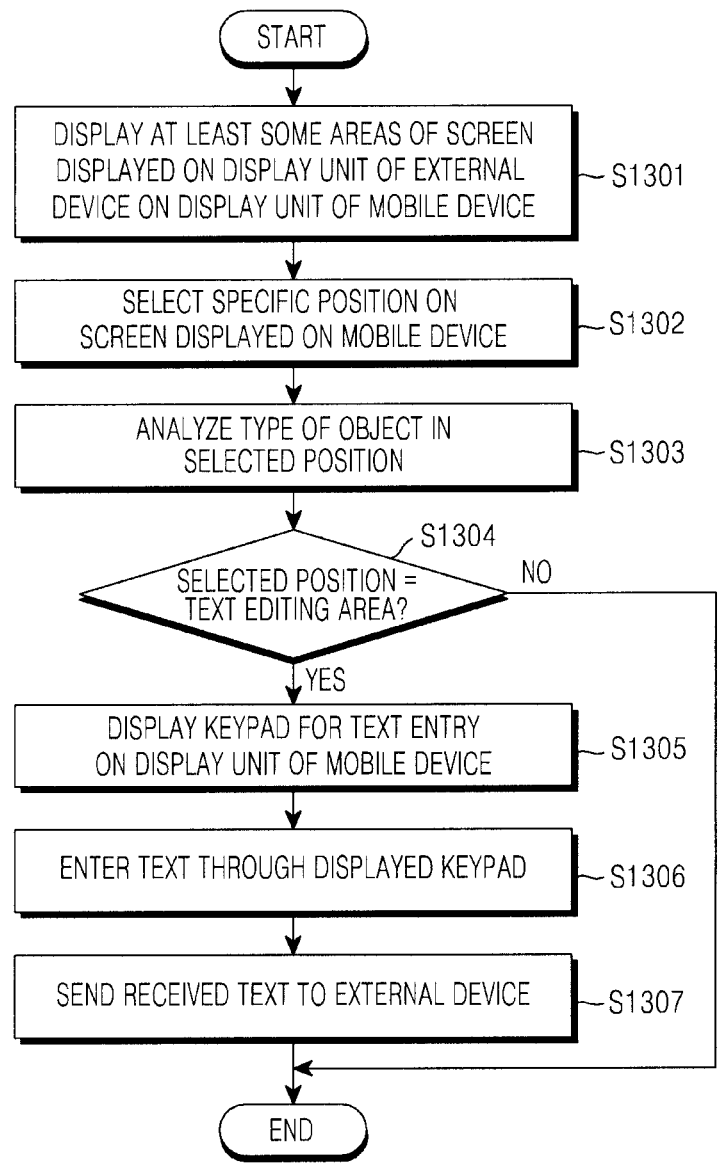
FIG. 13 is a flowchart illustrating a procedure for entering a text in a text editing area of an external device by means of a mobile device according to aspects of the present disclosure.

FIG. 5 illustrates an example of entering a text in a text editing area of an external device by means of a mobile device according to a first aspect of the present disclosure. FIG. 13 is a flowchart illustrating a procedure for entering a text in a text editing area of an external device by means of a mobile device according to the first aspect of the present disclosure. Referring to FIGS. 5 and 13, at least some areas of a full screen 510 displayed on a display unit (or a screen) of the external device 300 may be displayed on a display unit (for example, a touch screen) of the mobile device 100 (S1301).

In accordance with aspects of the present disclosure, if the user makes a first gesture (for example, a gesture of touching a specific position) on the mobile device 100, at least one function related to the screen displayed on the mobile device 100 may be performed.

In other words, if a specific position is selected on the screen displayed on the mobile device 100 by the user's input (for example, a specific gesture) (S1302), a type of an object displayed in the selected position may be analyzed (S1303). As a result of the analysis, as illustrated in FIG. 5, if the selected position corresponds to a text editing area 'EditText' 520 (for example, an address input window of a web page in FIG. 5) in the full screen 510 of the external device 300 (S1304), a keypad 530 for text entry may be displayed on the screen of the mobile device 100 (S1305). If a text is entered by means of the keypad 530 (S1306), the entered text may be sent to the external device 300 (S1307). Upon receiving the text entered through the mobile device 100, the external device 300 may enter the received text in the text editing area 520.

Although it is assumed in FIG. 5 that the keypad 530 for text entry is displayed on the screen of the mobile device 100 in a full screen mode, the keypad 530 may be displayed in some areas of the screen. In addition, although it is assumed in FIG. 5 that at least some areas of the full screen 510 displayed on the display unit (or a screen) of the external device 300, which are displayed on the display unit of the mobile device 100, are switched to a keypad screen, the at least some areas of the full screen 510 displayed on the display unit (or a screen) of the external device 300 and the keypad screen may be arranged at the same time in a split-screen way, or in an overlap way.

Figure 6:
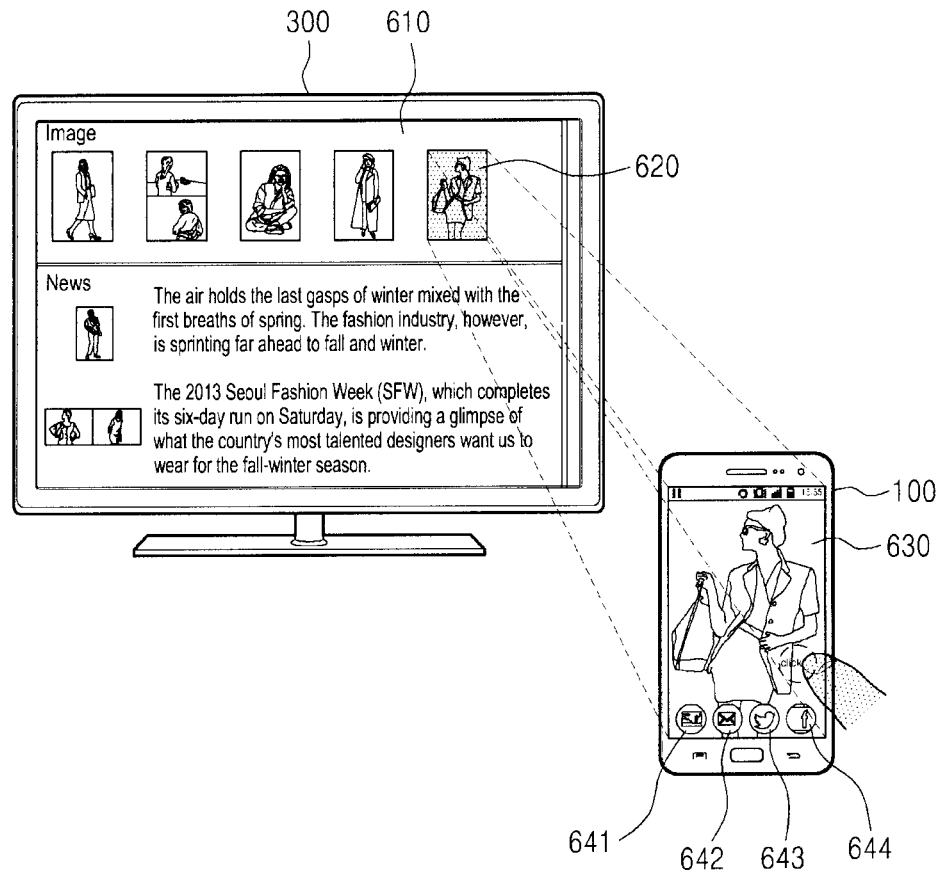
FIG. 6 illustrates an example of executing a function related to images displayed on an external device in a mobile device according to aspects of the present disclosure.
Figure 14:
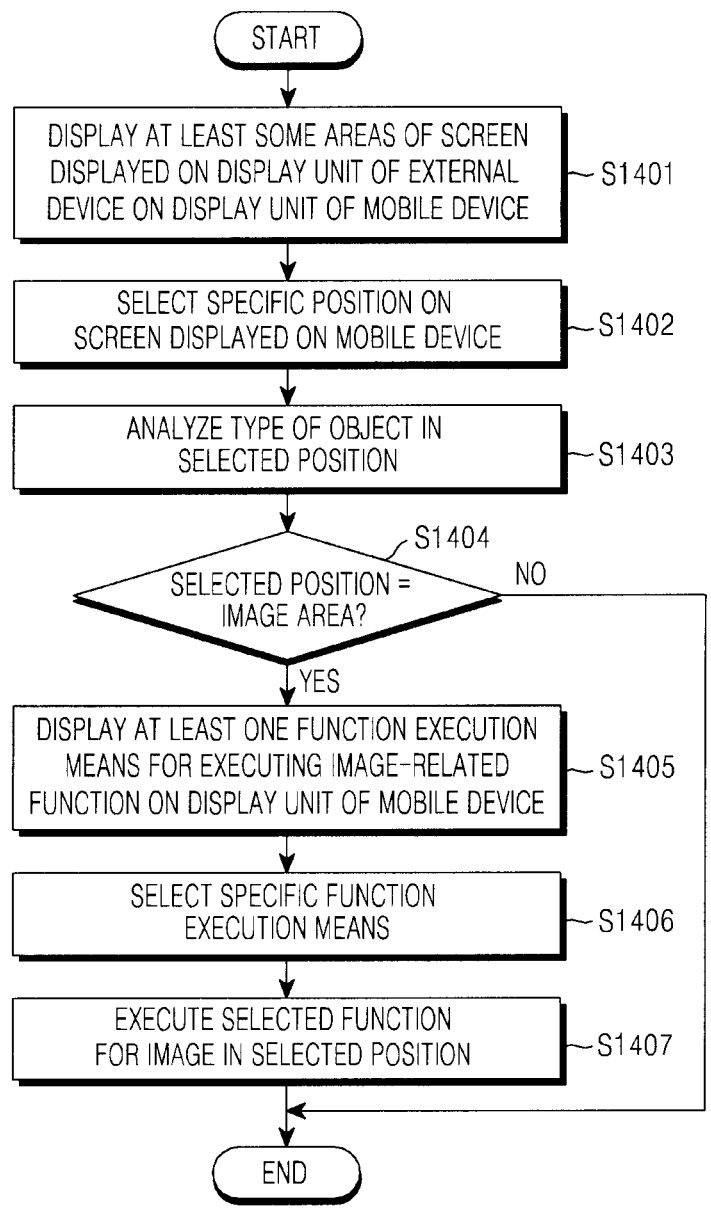
FIG. 14 is a flowchart illustrating a procedure for executing a function related to images displayed on an external device in a mobile device according to aspects of the present disclosure.

FIG. 6 illustrates an example of executing a function related to images displayed on an external device in a mobile device according to a second aspect of the present disclosure. FIG. 14 is a flowchart illustrating a procedure for executing a function related to images displayed on an external device in a mobile device according to the second aspect of the present disclosure. Referring to FIGS. 6 and 14, at least some areas of a full screen 610 displayed on the display unit (or a screen) of the external device 300 may be displayed on the display unit (for example, a touch screen) of the mobile device 100 (S1401).

In accordance with aspects of the present disclosure, if the user makes a first gesture (for example, a gesture of touching a specific position) on the mobile device 100, at least one function related to the screen displayed on the mobile device 100 may be performed.

In other words, if a specific position is selected on the screen displayed on the mobile device 100 by the user's input (for example, a specific gesture) (S1402), a type of an object in the selected position may be analyzed (S1403). As a result of the analysis, as illustrated in FIG. 6, if the selected position corresponds to an image area 620 (for example, a thumbnail image in an image search result screen in FIG. 6) in the full screen 610 of the external device 300 (S1404), at least one function execution means (e.g., a user interface component, such as an icon) capable of executing (e.g., invoking) an image editing or image-related function may be displayed on the screen of the mobile device 100 in a predetermined position (S1405).

For example, as illustrated in FIG. 6, if a photo object in the information transmitted to the mobile device 100 is selected, at least one icon for a photo-related function of the mobile device 100 may be displayed at the bottom of the object. For example, the photo-related icons may include an icon 641 for a function of copying the photo in a Gallery, an icon 642 for a function of sending the photo via an E-mail, and icons 643 and 644 for functions of uploading the photo to a Social Network Service (SNS) (for example, Twitter™, Facebook™ and the like) server. In addition, an icon for a function of editing or modifying photos may be displayed.

Although it is assumed in FIG. 6 that the means for executing the photo-related function are icons, in other examples any suitable user interface component may be used. For instance, a separate pop-up window may be generated and a plurality of photo-related functions may be displayed in the pop-up window in the form of a list. If at least one function is selected from the icons or the list, the function may be performed. For example, if the Gallery icon 641 is selected on the screen of the mobile device 100, the selected image 630 may be copied or stored in the Gallery.

In other words, the at least one function execution means capable of executing an image editing or image-related function may be displayed on the screen of the mobile device 100 in a predetermined position (S1405), and as described above, if the user selects a specific function execution means (S1406), the selected function may be executed for the image in the selected image (S1407).

Although it is assumed in FIG. 6 that the image corresponding to the selected position is displayed on the screen of the mobile device 100 in a full screen mode, the disclosure may be implemented such that at least some areas of the full screen 610 displayed on the display unit (or a screen) of the external device 300, which are displayed on the display unit of the mobile device 100, may be displayed on the screen of the mobile device 100 in a full screen mode, and only the selected image 620 in the full screen 610 may be displayed separately (for example, a border may be displayed around the selected image, or the saturation of the selected image area may be changed).

Figure 7:
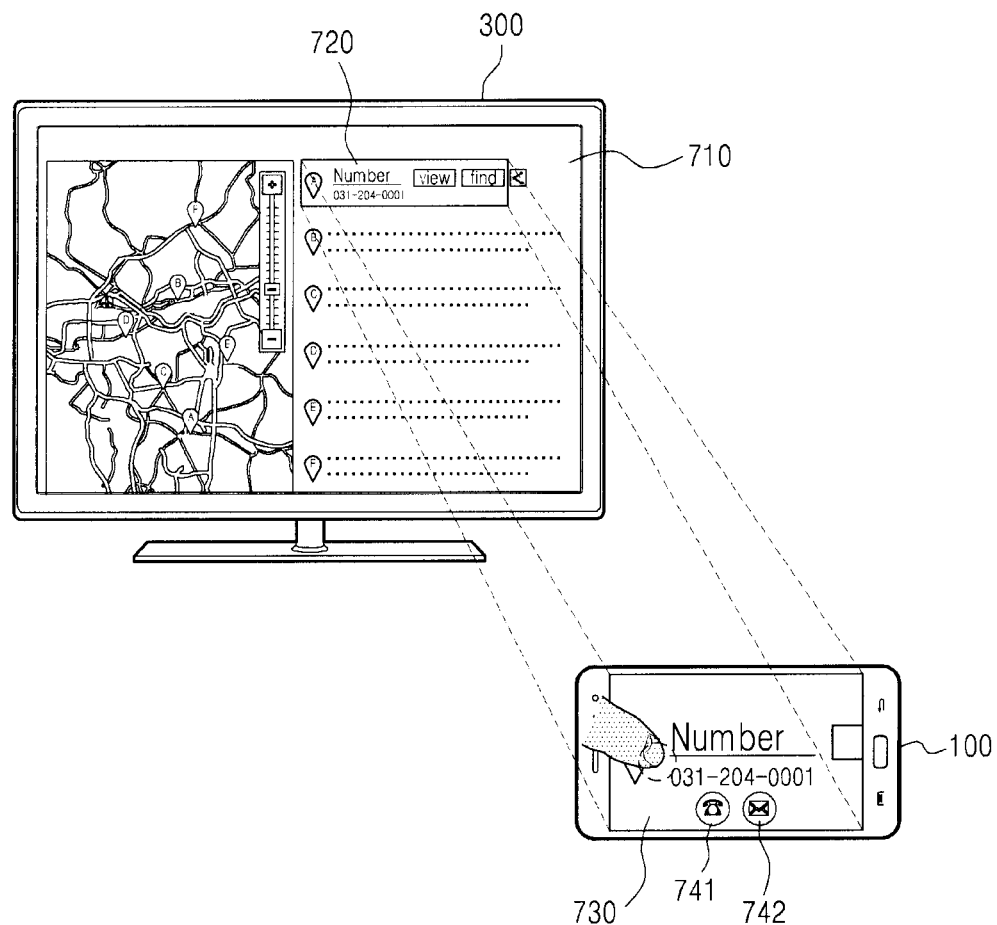
FIG. 7 illustrates an example of executing a function related to phone numbers displayed on an external device in a mobile device according to aspects of the present disclosure.
Figure 15:
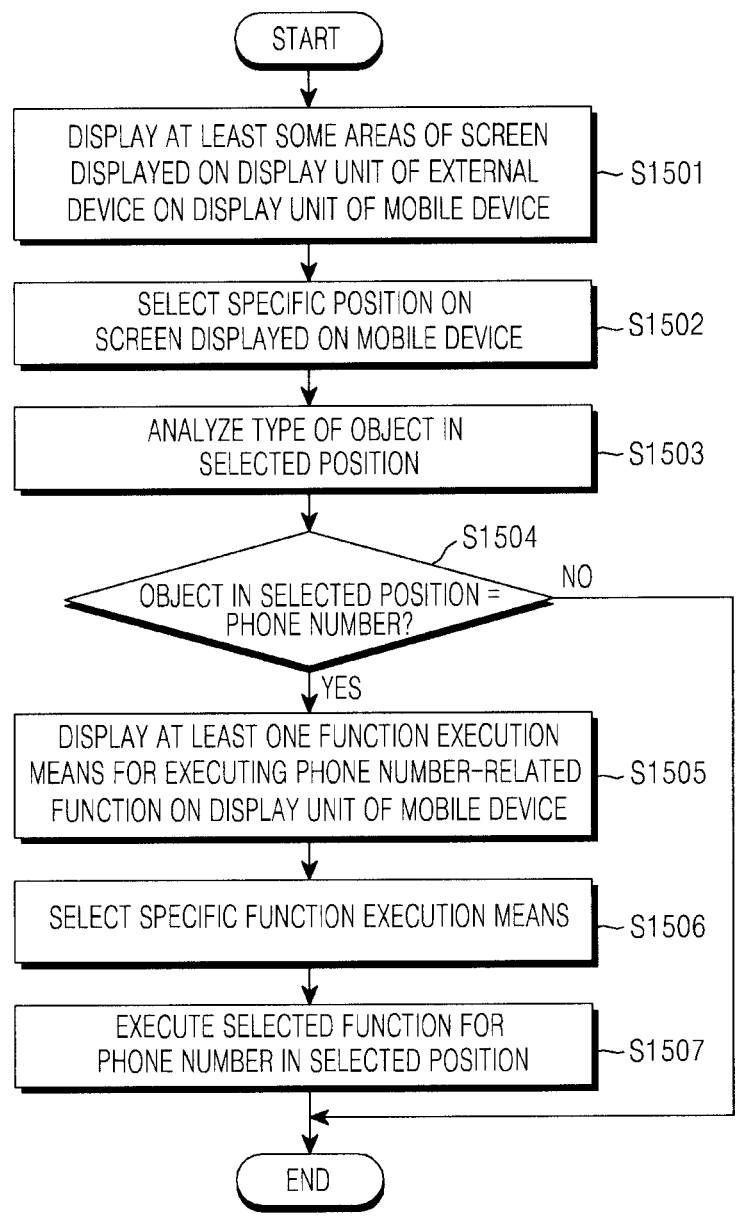
FIG. 15 is a flowchart illustrating a procedure for executing a function related to phone numbers displayed on an external device in a mobile device according to aspects of the present disclosure.

FIG. 7 illustrates an example of executing a function related to phone numbers displayed on an external device in a mobile device according to a third aspect of the present disclosure. FIG. 15 is a flowchart illustrating a procedure for executing a function related to phone numbers displayed on an external device in a mobile device according to the third aspect of the present disclosure. Referring to FIGS. 7 and 15, at least some areas of a full screen 710 displayed on the display unit (or a screen) of the external device 300 may be displayed on the display unit (for example, a touch screen) of the mobile device 100 (S1501).

In accordance with aspects of the present disclosure, if the user makes a first gesture (for example, a gesture of touching a specific position) on the mobile device 100, at least one function related to the screen displayed on the mobile device 100 may be performed.

In other words, if a specific position is selected on the screen 730 displayed on the mobile device 100 by the user's input (for example, a specific gesture) (S1502), a type of an object in the selected position may be analyzed (S1503). As a result of the analysis, as illustrated in FIG. 7, if the selected position corresponds to a phone number 720 in the full screen 710 of the external device 300 (S1504), at least one function execution means capable of executing a function related to phone numbers may be displayed on the screen of the mobile device 100 in a predetermined position (S1505).

For example, as described above, if a phone number in the information transmitted to the mobile device 100 is selected, an icon for making a direct call to the phone number or storing the phone number in a address book may be displayed in a certain area (for example, at the bottom of the screen in FIG. 7) of the screen of the mobile device 100.

In other words, as illustrated in FIG. 7, if a phone number object in the information transmitted to the mobile device 100 is selected, at least one icon for a phone number-related function of the mobile device 100 may be displayed at the bottom of the object. For example, the phone number-related icon may include an icon 741 for a function of making a call to the phone number, an icon for a function of storing the phone number in an address book, and an icon 742 for a function of sending a text message to the phone number.

Although it is assumed in FIG. 7 that the means for executing the phone number-related function is displayed in icons, a separate pop-up window may be generated and a plurality of phone number-related functions may be displayed in the pop-up window in the form of a list.

If at least one function is selected from the icons or the list, the function may be performed. For example, if a Phone-Dialer icon 741 is selected on the screen of the mobile device 100, a Dialing application may be immediately executed and a call may be made to the selected phone number by the executed Dialing application.

In other words, the at least one function execution means capable of executing a phone number-related function may be displayed on the screen of the mobile device 100 in a predetermined position (S1505), and as described above, if the user selects a specific function execution means (S1506), the selected function may be executed for the phone number in the selected position (S1507).

Figure 8:
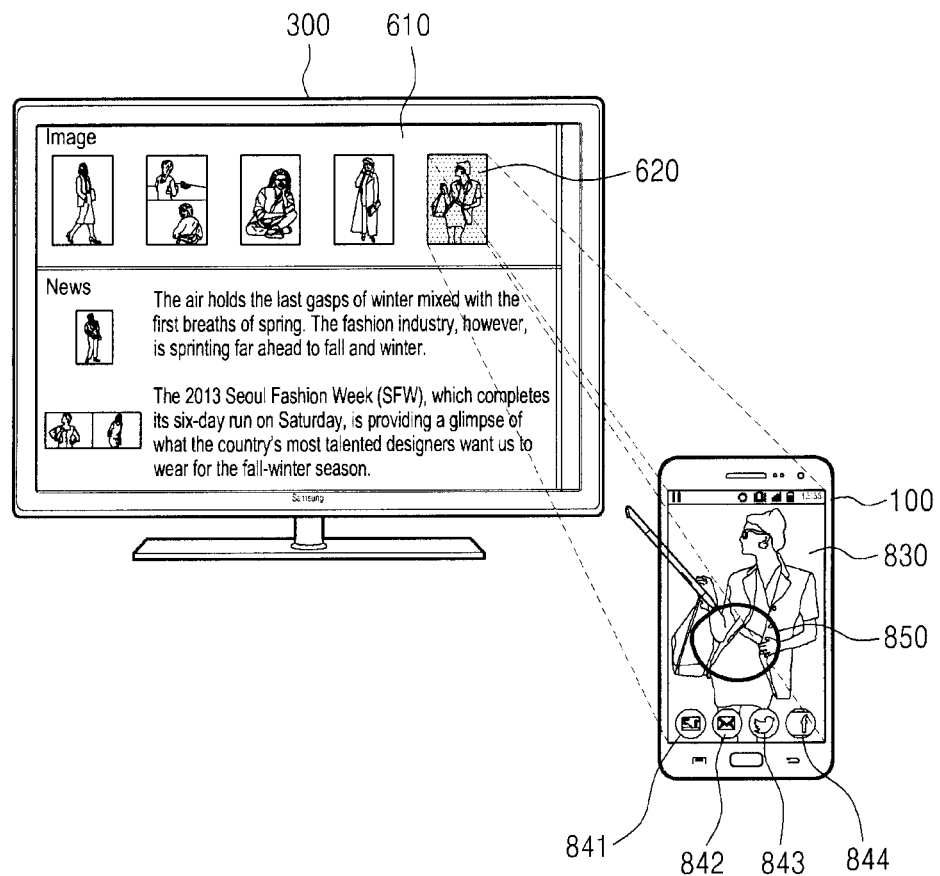
FIG. 8 illustrates an example of executing a function related to images displayed on an external device using an electronic pen of a mobile device according to aspects of the present disclosure.
Figure 16:
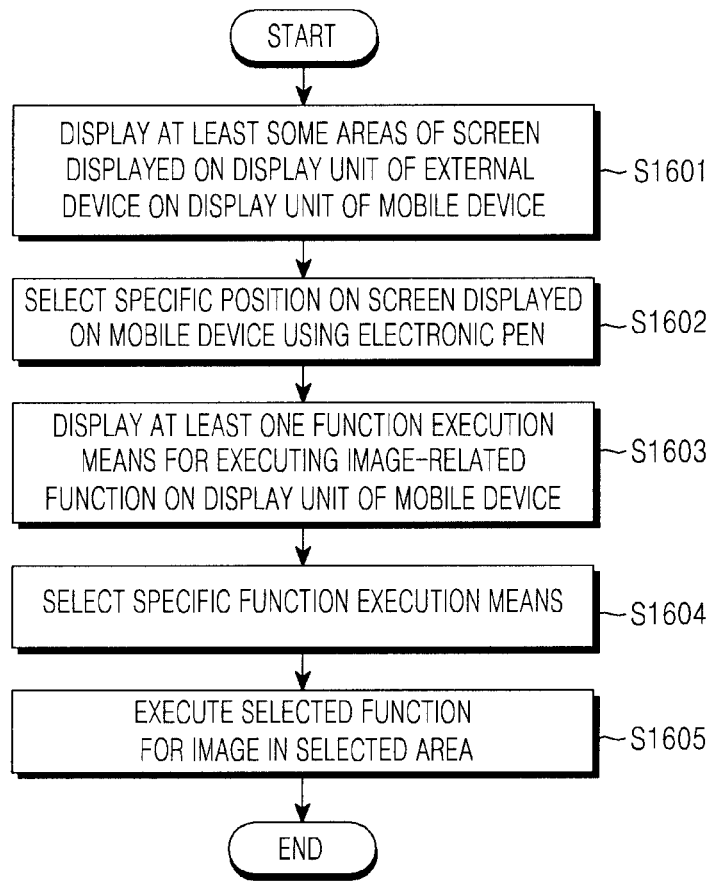
FIG. 16 is a flowchart illustrating a procedure for executing a function related to images displayed on an external device using an electronic pen of a mobile device according to aspects of the present disclosure.

FIG. 8 illustrates an example of executing a function related to images displayed on an external device using an electronic pen of a mobile device according to a fourth aspect of the present disclosure. FIG. 16 is a flowchart illustrating a procedure for executing a function related to images displayed on an external device using an electronic pen of a mobile device according to the fourth aspect of the present disclosure.

Referring to FIGS. 8 and 16, at least some areas 620 of the full screen 610 displayed on the display unit (or a screen) of the external device 300 may be displayed on the display unit (for example, a touch screen) of the mobile device 100 (S1601).

In accordance with aspects of the present disclosure, if the user makes a first gesture (for example, a gesture of touching a specific position) on the mobile device 100, at least one function related to the screen displayed on the mobile device 100 may be performed.

In other words, in accordance with aspects of the present disclosure, if the user selects a specific area on the screen of the mobile device 100 using an electronic pen or the like (S1602), at least one function related to the selected area may be performed. Therefore, at least one function execution means capable of executing an image editing or image-related function for the selected area may be displayed on the screen of the mobile device 100 in a predetermined position (S1603).

For example, as illustrated in FIG. 8, if a specific area (for example, a closed area) in the information transmitted to the mobile device 100 is selected, at least one icon for an image-related function of the mobile device 100 may be displayed at the bottom of the object. For example, the image-related icons may include an icon 841 for a function of copying the image in a Gallery, an icon 842 for a function of sending the image via an E-mail, and icons 843 and 844 for functions of uploading the image to an SNS (for example, Twitter™, Facebook™ and the like) server. In addition, an icon for a function of editing or modifying images may be displayed.

Although it is assumed in FIG. 8 that the means for executing the image-related function is displayed in icons, a separate pop-up window may be generated and a plurality of image-related functions may be displayed in the pop-up window in the form of a list.

If at least one function is selected from the icons or the list, the function may be performed. For example, if a Gallery icon 841 is selected on the screen of the mobile device 100, an image 830 in the selected area may be copied or stored in the Gallery.

In other words, the at least one function execution means capable of executing an image editing or image-related function may be displayed on the screen of the mobile device 100 in a predetermined position (S1603), and as described above, if the user selects a specific function execution means (S1604), the selected function may be executed for the image in the selected area (S1605).

Although it is assumed in FIG. 8 that a specific area 850 is selected on the screen of the mobile device 100 by means of the electronic pen, any means capable of selecting a specific area on the screen may be used in addition to the electronic pen, such as a bare hands touch, etc.

In accordance with aspects of the present disclosure, the at least some areas 620 of the full screen 610 displayed on the display unit (or a screen) of the external device 300, which are displayed on the display unit of the mobile device 100, may be displayed on the screen of the mobile device 100 in a full screen mode, and only the selected area 850 in the screen may be displayed separately (for example, a border may be displayed around the selected area, or the saturation of the selected image area may be changed).

Figure 9:
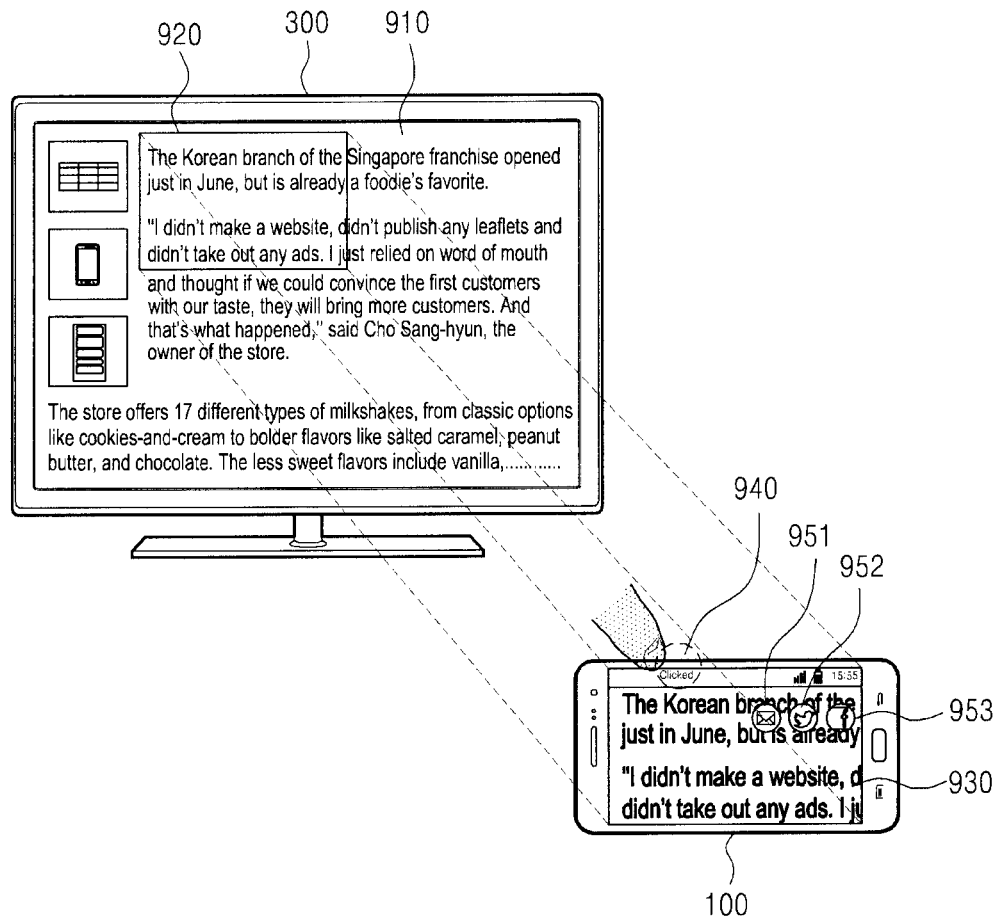
FIG. 9 illustrates an example of executing a function related to web links included in a screen displayed on an external device in a mobile device according to aspects of the present disclosure.
Figure 17:
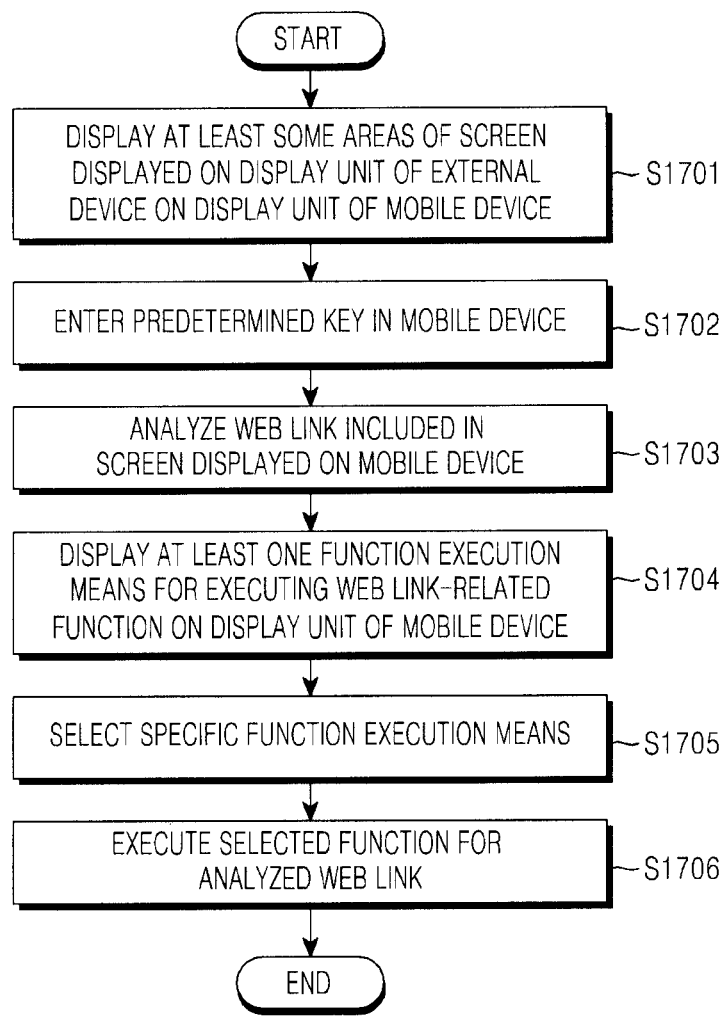
FIG. 17 is a flowchart illustrating a procedure for executing a function related to web links included in a screen displayed on an external device in a mobile device according to aspects of the present disclosure.

FIG. 9 illustrates an example of executing a function related to web links included in a screen displayed on an external device in a mobile device according to a fifth aspect of the present disclosure. FIG. 17 is a flowchart illustrating a procedure for executing a function related to web links included in a screen displayed on an external device in a mobile device according to the fifth aspect of the present disclosure.

Referring to FIGS. 9 and 17, at least some areas 920 of a full screen 910 displayed on the display unit (or a screen) of the external device 300 may be displayed on the display unit (for example, a touch screen) of the mobile device 100 (S1701).

In accordance with aspects of the present disclosure, if the user presses a predetermined key (for example, a hard key) on the mobile device 100 (S1702), at least one function related to the screen displayed on the mobile device 100 may be executed. The predetermined key may include any keys mounted on the mobile device 100. For example, the predetermined key may include a camera key, a home button, a menu button, a back button, a power/lock button, a volume-up button, a volume-down button and the like, and the present disclosure is not limited thereto. The predetermined key may be configured with a combination of a plurality of keys.

In other words, in accordance with aspects of the present disclosure, if the user clicks a predetermined key (for example, a power/lock button 940 in FIG. 9) on the mobile device 100, at least one function related to web links included in the information displayed on the screen of the mobile device 100 may be performed. Therefore, by analyzing a screen 930 displayed on the mobile device 100, web links included in the screen 930 may be analyzed (or extracted) (S1703).

Thereafter, at least one function execution means capable of executing a function related to the analyzed web links may be displayed on the screen of the mobile device 100 in a predetermined position (S1704).

For example, as illustrated in FIG. 9, if a predetermined key 940 is entered in the mobile device 100, at least one icon for the web link-related function of the mobile device 100 may be displayed in a predetermined position on the screen. For example, the web link-related icons may include an icon 951 for a function capable of sending the web link in an SMS message, and icons 952 and 953 for functions of uploading the web link to an SNS (for example, Twitter™, Facebook™ and the like) server.

Although it is assumed in FIG. 9 that the means for executing the web link-related function is displayed in icons, a separate pop-up window may be generated and a plurality of web link-related functions may be displayed in the pop-up window in the form of a list. If at least one function is selected from the icons or the list, the function may be performed.

In other words, the at least one function execution means capable of executing a web link-related function may be displayed on the screen of the mobile device 100 in a predetermined position (S1704), and as described above, if the user selects a specific function execution means (S1705), the selected function may be executed for the analyzed web link (S1706).

Figure 18:
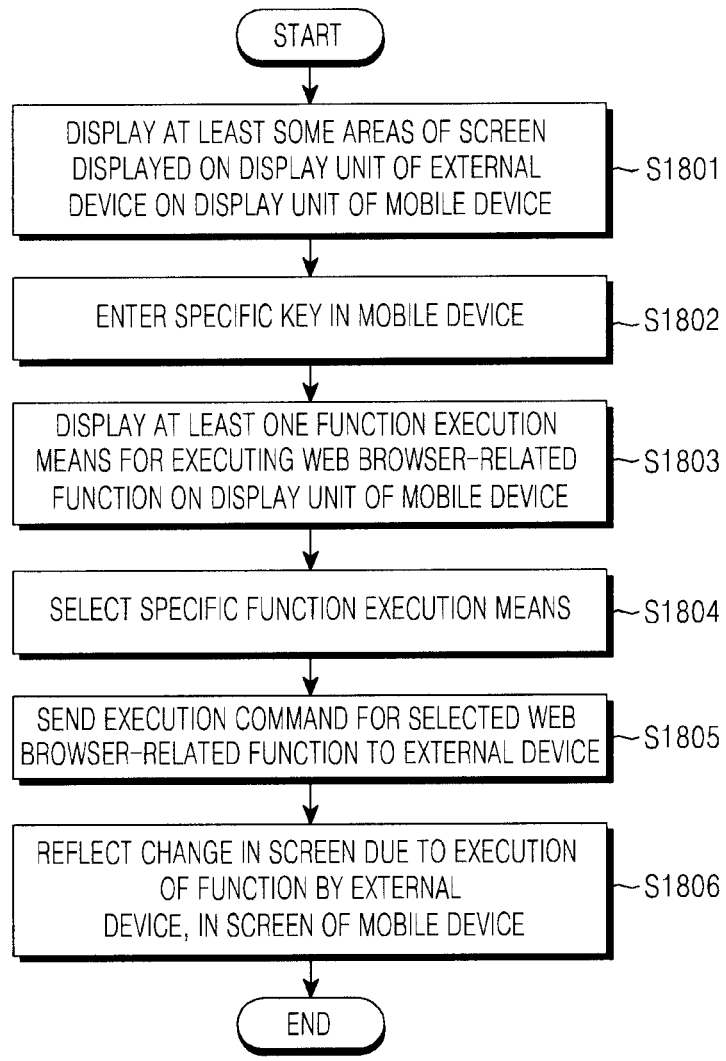
FIG. 18 is a flowchart illustrating a procedure for executing a function related to a web browser of a screen displayed on an external device in a mobile device according to aspects of the present disclosure.

FIGS. 10A to 10D illustrate an example of executing a function related to a web browser of a screen displayed on an external device in a mobile device according to a sixth aspect of the present disclosure. FIG. 18 is a flowchart illustrating a procedure for executing a function related to a web browser of a screen displayed on an external device in a mobile device according to the sixth aspect of the present disclosure.

Referring to FIGS. 10 and 18, at least some areas 1020 of a full screen 1010 displayed on the display unit (or a screen) of the external device 300 may be displayed on the display unit (for example, a touch screen) 1030 of the mobile device 100 (S1801).

In accordance with aspects of the present disclosure, if the user presses a predetermined key or a specific key (for example, a menu button 1040 of the mobile device 100) on the mobile device 100 (S1802), at least one function related to the screen displayed on the mobile device 100 may be performed. The predetermined key may include any keys mounted on the mobile device 100. For example, the predetermined key may include a camera key, a home button, a menu button, a back button, a power/lock button, a volume-up button, a volume-down button and the like, and the present disclosure is not limited thereto. The predetermined key may be configured with a combination of a plurality of keys.

In other words, in accordance with aspects of the present disclosure, if the user clicks a specific key or a predetermined key (for example, the menu button 1040 in FIG. 10A) on the mobile device 100, at least one function related to a web browser for browsing a web page displayed on the screen of the mobile device 100 may be performed.

Figure 10A:
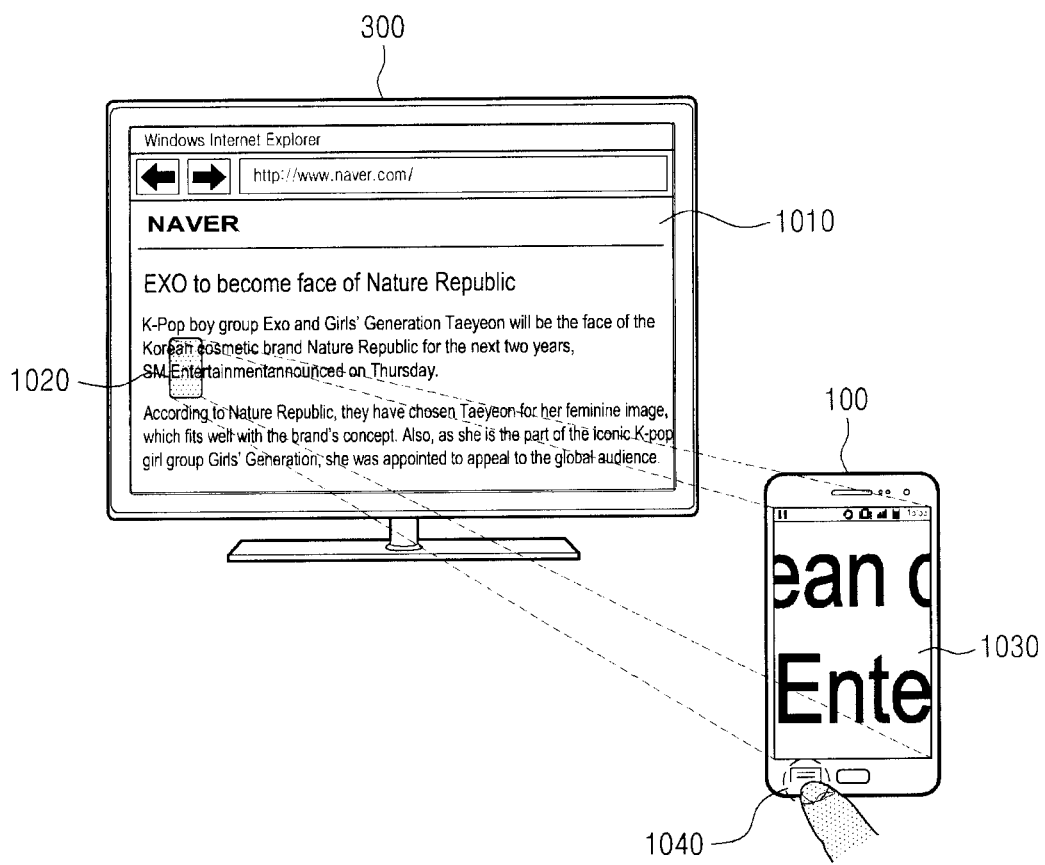
FIG. 10A, FIG. 10B, FIG. 10C and FIG. 10D illustrate an example of executing a function related to a web browser of a screen displayed on an external device in a mobile device according to a aspects of the present disclosure.
Figure 10B:
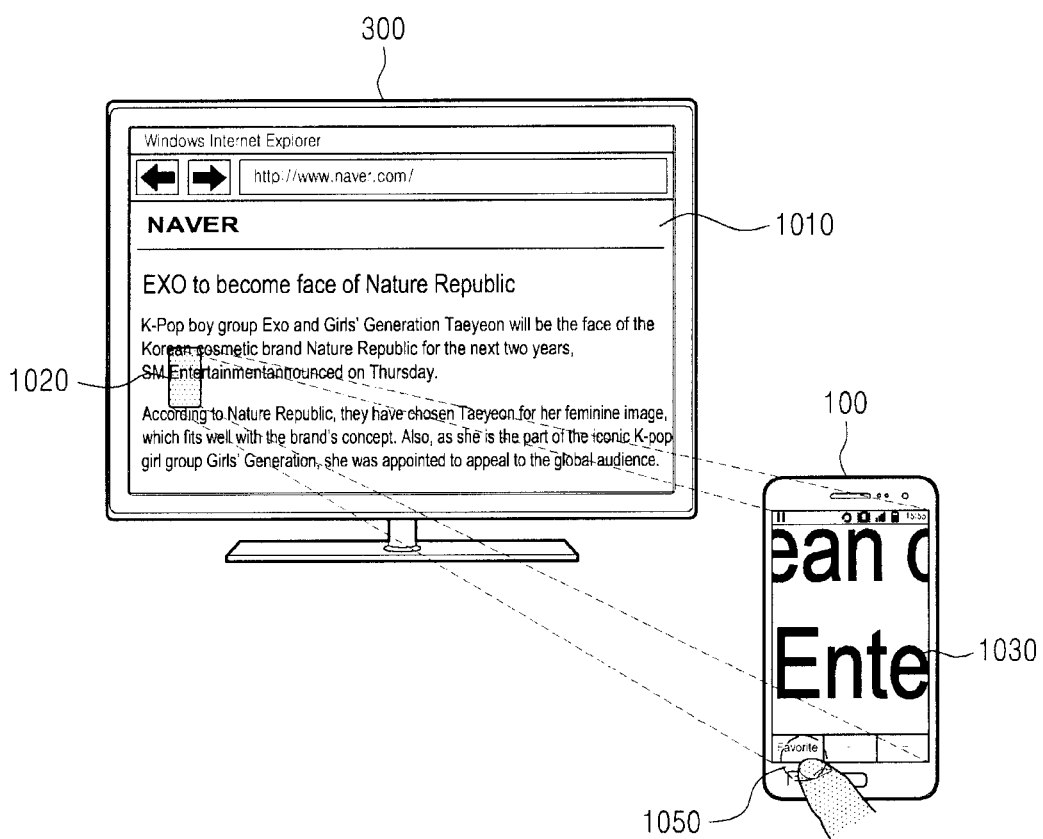

Therefore, as illustrated in FIG. 10B, if some of the web page is displayed on the screen 1030 of the mobile device 100, at least one function execution means capable of executing a web browser-related function may be displayed in a predetermined position of the screen 1030 as the predetermined key or the specific key is selected (S1803). For example, in FIG. 10B, a Favorites function 1050 may be displayed as a web browser-related function.

Figure 10C:
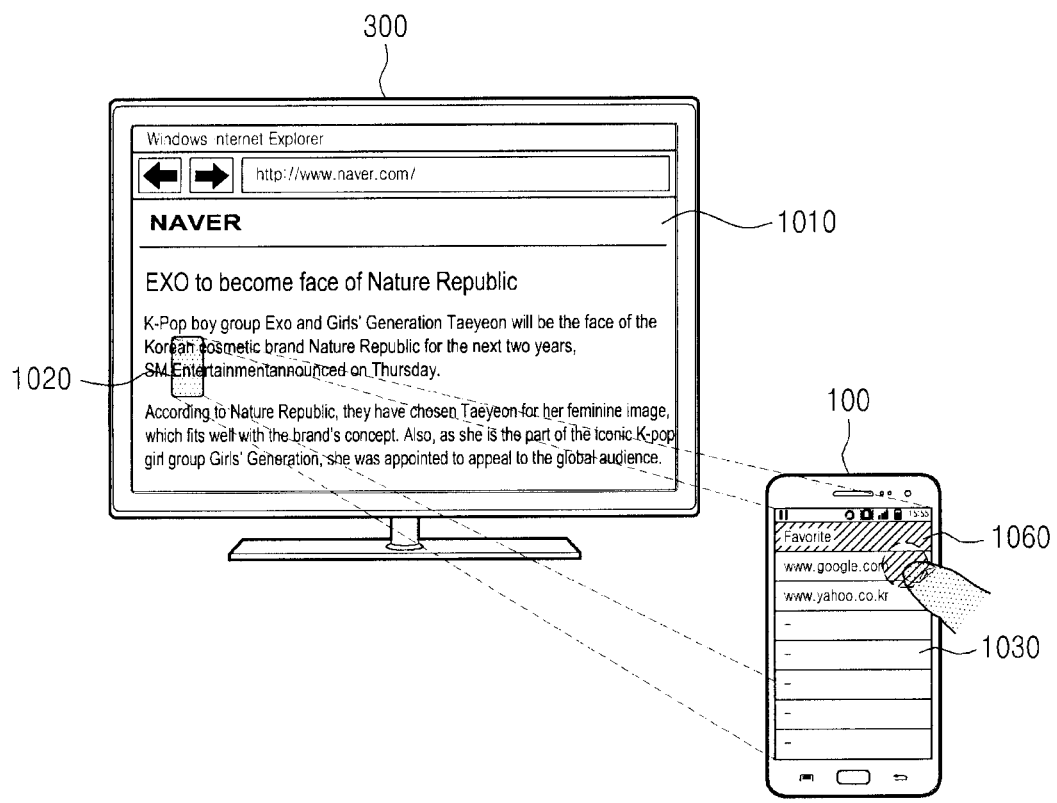
Figure 10D:
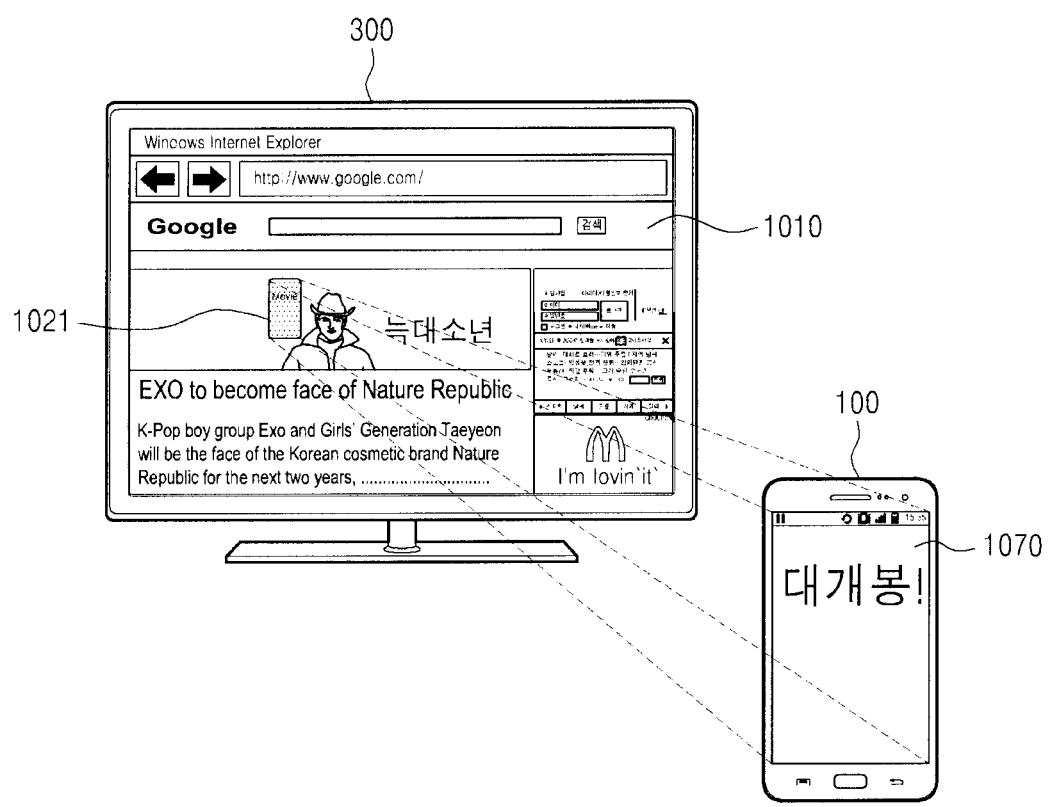

As illustrated in FIG. 10C, if the user selects the Favorites function 1050, a pre-stored Favorites list 1060 may be displayed on the screen 1030. If the user selects a specific address (for example, 'www.google.com' in FIG. 10C) from the Favorites list 1060, information about the selected address may be transmitted to the external device 300.

Upon receiving the address information from the mobile device 100, the external device 300 may switch the web page to the received address by means of the web browser. Accordingly, in FIG. 10D, a web page with an address of 'www.google.com' may be displayed depending on the address information. As such, if the screen of the external device 300 is switched to a new screen 1010 as the web page is switched, an area corresponding to a virtual window 1021 in the switched screen may be displayed on the screen 1070 of the mobile device 100.

In other words, at least one function execution means capable of executing a web browser-related function may be displayed on the screen 1070 of the mobile device 100 in a predetermined position (S1803), and as described above, if the user selects a specific function execution means (S1804), an execution command for the selected web browser-related function (for example, a Favorites function) may be sent to the external device 300 (S1805). Accordingly, the screen is switched in the external device 300 depending on the execution of the function, and the switching of the screen may be reflected even in the screen of the mobile device 100 (S1806). Therefore, it can be appreciated from FIG. 10D that the screen 1070 of the mobile device 100 may be changed as the screen 1010 of the external device 300 is changed.

Figure 19:
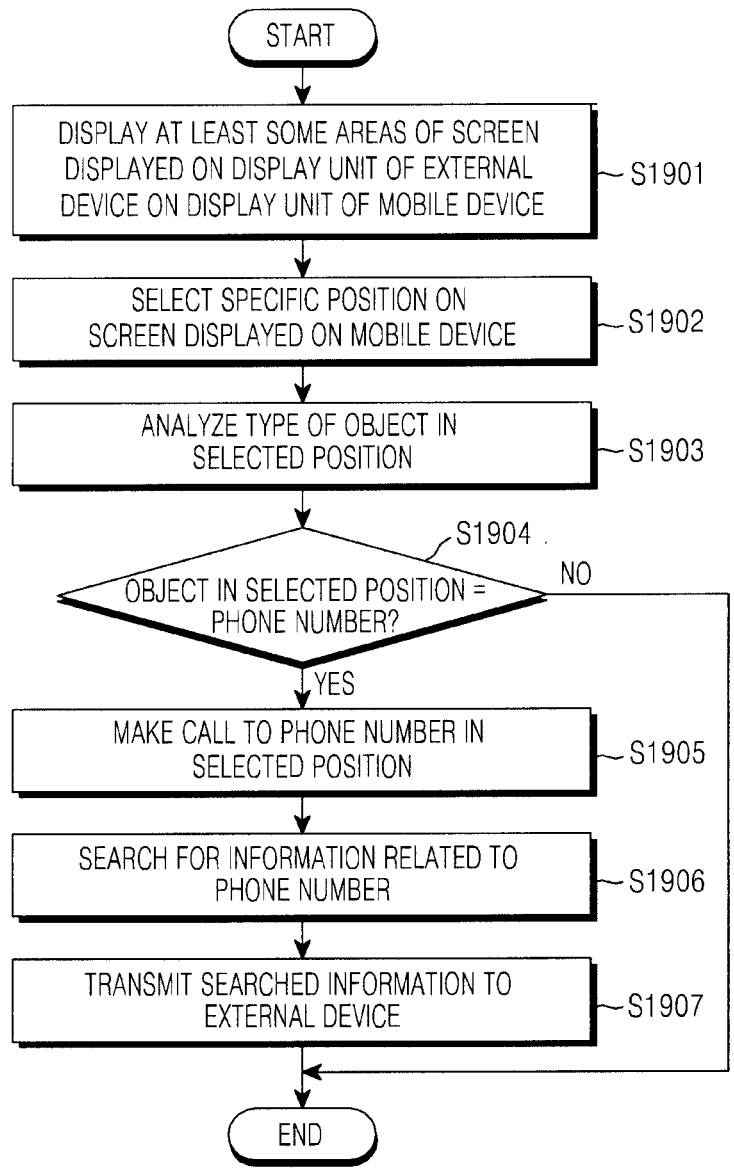
FIG. 19 is a flowchart illustrating a procedure for providing information related to phone numbers displayed on an external device in a mobile device according to aspects of the present disclosure.

FIGS. 11A to 11D illustrate an example of providing information related to phone numbers displayed on an external device in a mobile device according to a seventh aspect of the present disclosure. FIG. 19 is a flowchart illustrating a procedure for providing information related to phone numbers displayed on an external device in a mobile device according to the seventh aspect of the present disclosure.

Referring to FIGS. 11 and 19, at least some areas 1111 of a full screen 1110 displayed on the display unit (or a screen) of the external area device 300 may be displayed on the display unit (for example, a touch screen 1120) of the mobile device 100 (S1901).

In accordance with aspects of the present disclosure, if the user makes a first gesture (for example, a gesture of touching a specific position) on the mobile device 100, at least one function related to the screen displayed on the mobile device 100 may be performed.

In other words, if a specific position is selected on the screen 1120 displayed on the mobile device 100 by the user's input (for example, a specific gesture) (S1902), a type of an object in the selected position may be analyzed (S1903). As a result of the analysis, as illustrated in FIG. 11A, if the selected position corresponds to a phone number 1111 in the full screen 1110 of the external device 300 (S1904), at least one function execution means capable of executing a phone number-related function may be displayed on the screen of the mobile device 100 in a predetermined position (S1905).

For example, if the phone number in the information transmitted to the mobile device 100 is selected, an icon for a function of making a direct call to the phone number or an icon for a function of storing the phone number in an address book may be displayed in at least some areas (for example, at the bottom of the screen in FIG. 11A) of the screen of the mobile device 100.

Figure 11A:
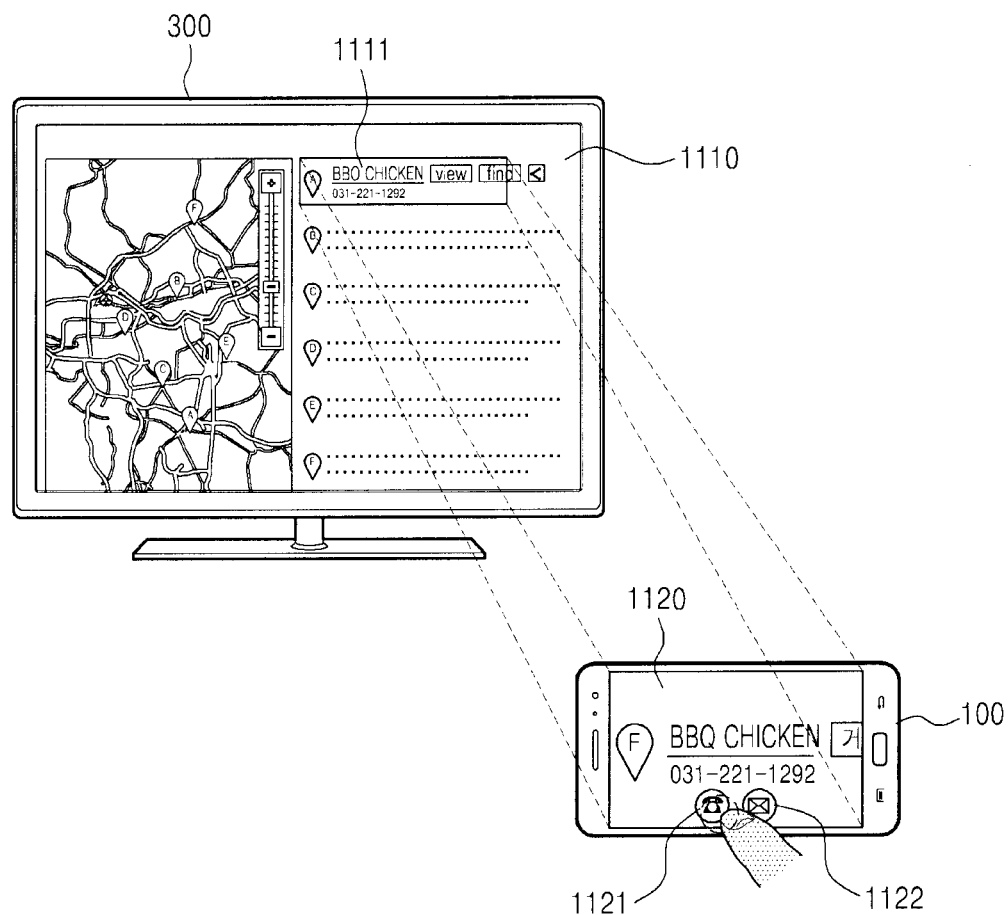
FIG. 11A, FIG. 11B, FIG. 11C and FIG. 11D illustrate an example of providing information related to phone numbers displayed on an external device in a mobile device according to aspects of the present disclosure.

In other words, as illustrated in FIG. 11A, if a phone number object in the information transmitted to the mobile device 100 is selected, at least one icon for a phone number-related function of the mobile device 100 may be displayed at the bottom of the object. For example, the phone number-related icons may include an icon 1121 for a function of making a call to the phone number, an icon for a function of storing the phone number in an address book, and an icon 1122 for a function of sending a text message to the phone number.

Although it is assumed in FIG. 11A that the means for executing the phone number-related function is displayed in icons, a separate pop-up window may be generated and a plurality of phone number-related functions may be displayed in the pop-up window in the form of a list.

If at least one function is selected from the icons or the list, the function may be performed. For example, if the Phone-Dialer icon 1121 is selected on the screen of the mobile device 100, a Dialing application may be immediately executed as illustrated in FIG. 11B and a call may be made to the selected phone number by the executed Dialing application (S1905).

In accordance with aspects of the present disclosure, the phone number-related information may be displayed on the screen 1130 of the external device 300. Therefore, as soon as the Dialing application is executed in the mobile device 100, the phone number-related information stored in the mobile device 100 or the service server 230 may be searched for or extracted using the phone number (S1906), and transmitted to the external device 300 (S1907). Accordingly, in the external device 300, the transmitted phone number-related information may be displayed on the screen 1130. The phone number-related information may include advertising information, product information, service information, sales information and the like for the store corresponding to the phone number. A 'Call Connecting' message 1141 may be displayed in the Dialing application displayed on the screen 1140 of the mobile device 100.

Alternatively, as soon as the Dialing application is executed in the mobile device 100, the mobile device 100 may instruct the external device 300 to display the phone number-related information on its screen. In response to the instruction from the mobile device 100, the external device 300 may display the information stored in its storage unit 304 on the screen 1130, or may request the phone number-related information from the service server 230 and display the requested information on the screen 1130.

Figure 11B:
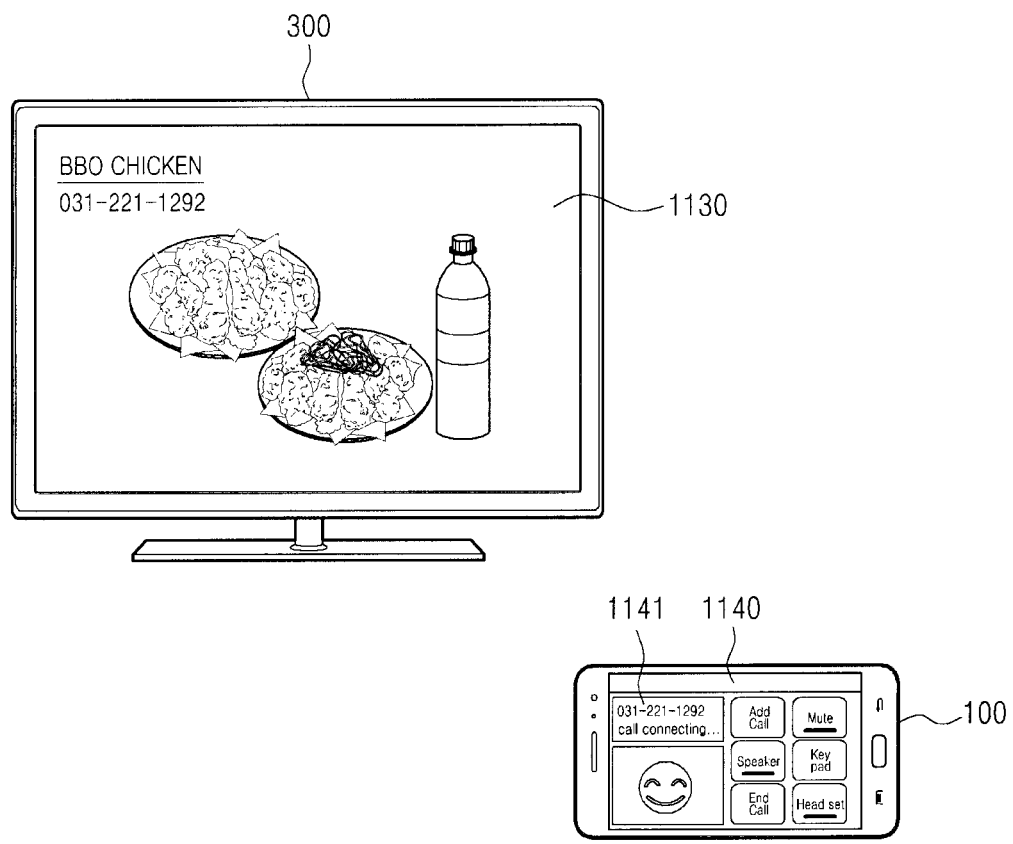

In FIG. 11B, since the phone number is a phone number for a 'BBQ Chicken' franchisee, advertising information provided for the franchisee may be displayed on the screen 1130 of the external device 300. The advertising information may be controlled to be displayed only during call connection, or may be controlled to be displayed until a call is in progress after the call is connected.

Figure 11C:
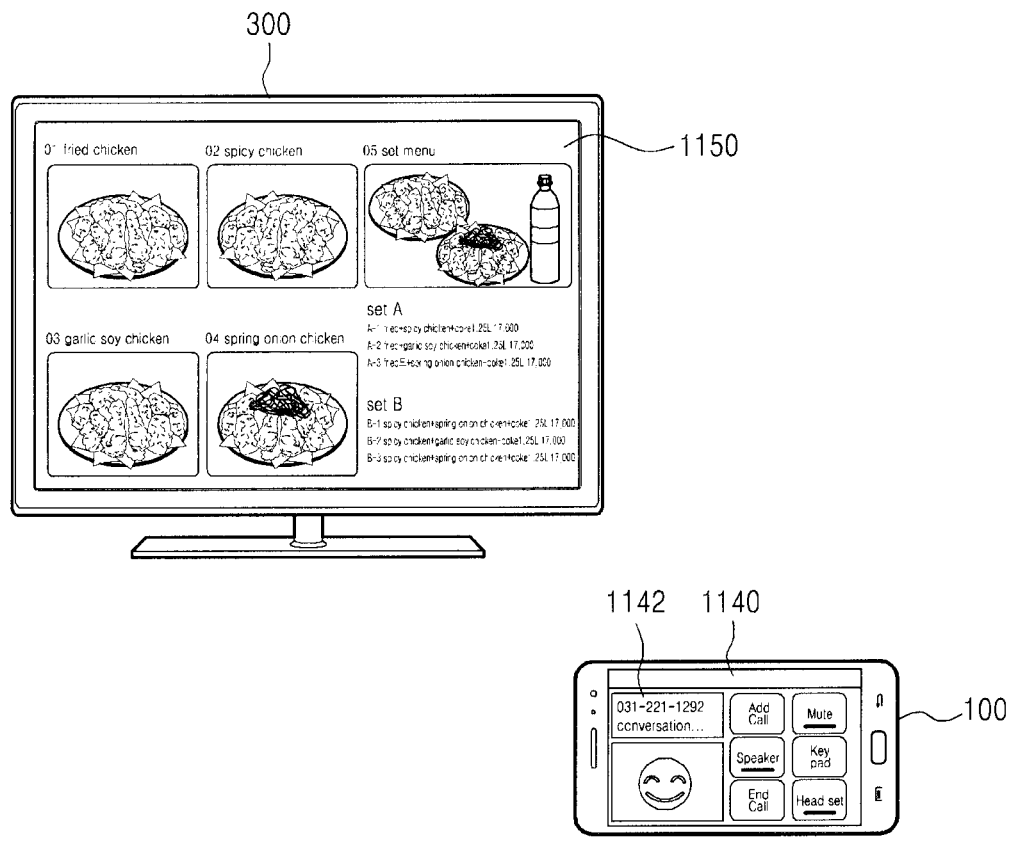

As illustrated in FIG. 11C, if the call is connected, a 'Phone Conversation' or 'Phone Dialog' message 1142 may be displayed in the Dialing application displayed on the screen 1140 of the mobile device 100, and information different from that during the call connection may be displayed on the screen 1150 of the external device 300. For example, as illustrated in FIG. 11C, if the call is connected, order menu information may be displayed on the screen 1150 of the external device 300.

Figure 11D:
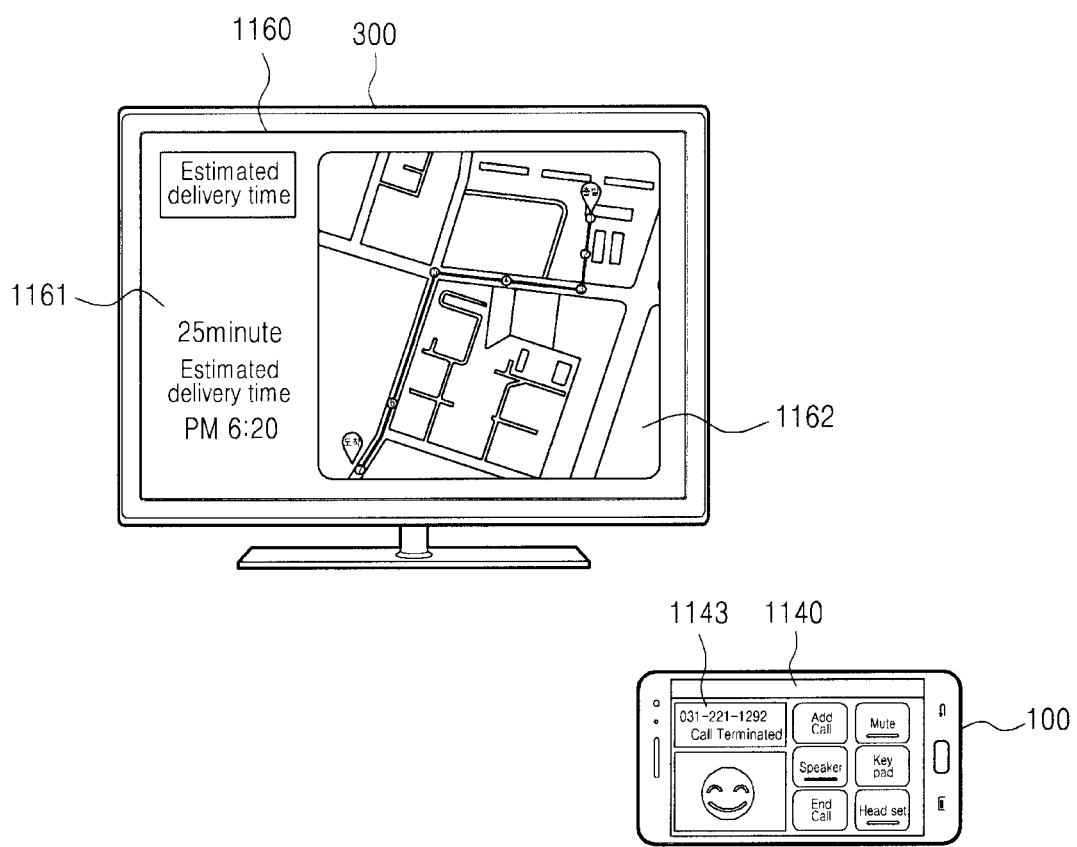

Next, as illustrated in FIG. 11D, if the call is terminated, a 'Call Terminated' message 1143 may be displayed in the Dialing application displayed on the screen 1140 of the mobile device 100, and information different from that during the call connection or the phone conversation may be displayed on the screen 1160 of the external device 300. For example, as illustrated in FIG. 11D, if the call is terminated, estimated delivery time information 1161 and delivery route information for the completed order may be displayed on the screen 1160 of the external device 300 using an electronic map 1162.

Therefore, if the object in the selected position on the screen of the mobile device 100 is a phone number (S1904) and the function of making a call to the phone number in the selected position is executed (S1905), then the phone number-related information may be searched for (S1906), and the searched information may be transmitted to the external device 300 (S1907) so that the related information may be displayed on the external device 300.

In other words, as illustrated in FIGS. 11A to 11D, in accordance with aspects of the present disclosure, if a call is made using a phone function in the mobile device 100 (for example, a smart phone), information related to the phone number may be displayed on the screen of the external device 300 (for example, a TV).

The information displayed on the TV screen may be either the information that is stored in advance in the smart phone, or the information that the external device 300 receives in real time by requesting it from the service server 230 that provides content based on phone numbers. In accordance with aspects of the present disclosure, a phone number and a web page address of its vendor may be obtained from the Internet web page. Accordingly, the external device 300 may be implemented to request content from the web page address of the vendor, and display the received content on the screen.

As illustrated even in FIG. 11D, information may be reprocessed based on the location of the caller, the location of the store, the real-time traffic, the received orders of the vendor, and the like and displayed on the TV screen using an electronic map.

In addition, as described above, details of the related information may be displayed on the external device 300 differently depending on whether the screen is a screen before call connection, a screen during a call, a screen after call termination, a hold screen during a call, or the like.

The examples illustrated in FIGS. 11A to 11D correspond to the search results obtained by searching for chicken shops on a TV. In accordance with aspects of the present disclosure, if a phone number is displayed as illustrated in FIG. 11A, a Dialing application may be executed in the smart phone as illustrated in FIG. 11B as the user clicks the phone number on the smart phone. At the same time, an advertisement (see FIG. 11B) related to the chicken shop may be displayed on the TV screen during call connection, and once the call is connected, the menu (see FIG. 11C) or user coupons may be displayed on the TV screen. Finally, if the call is terminated, information may be reprocessed (see FIG. 11D) based on the location of the caller, the location of the store, the real-time traffic, the received orders of the vendor, and the like and the estimated arrival time may be displayed on the screen of the external device 300, for the user. The illustrated examples show that the screen may display different content depending on the progress of the call, and the present disclosure may not be limited to the range or type of the content used in each phase.

Figure 12A:
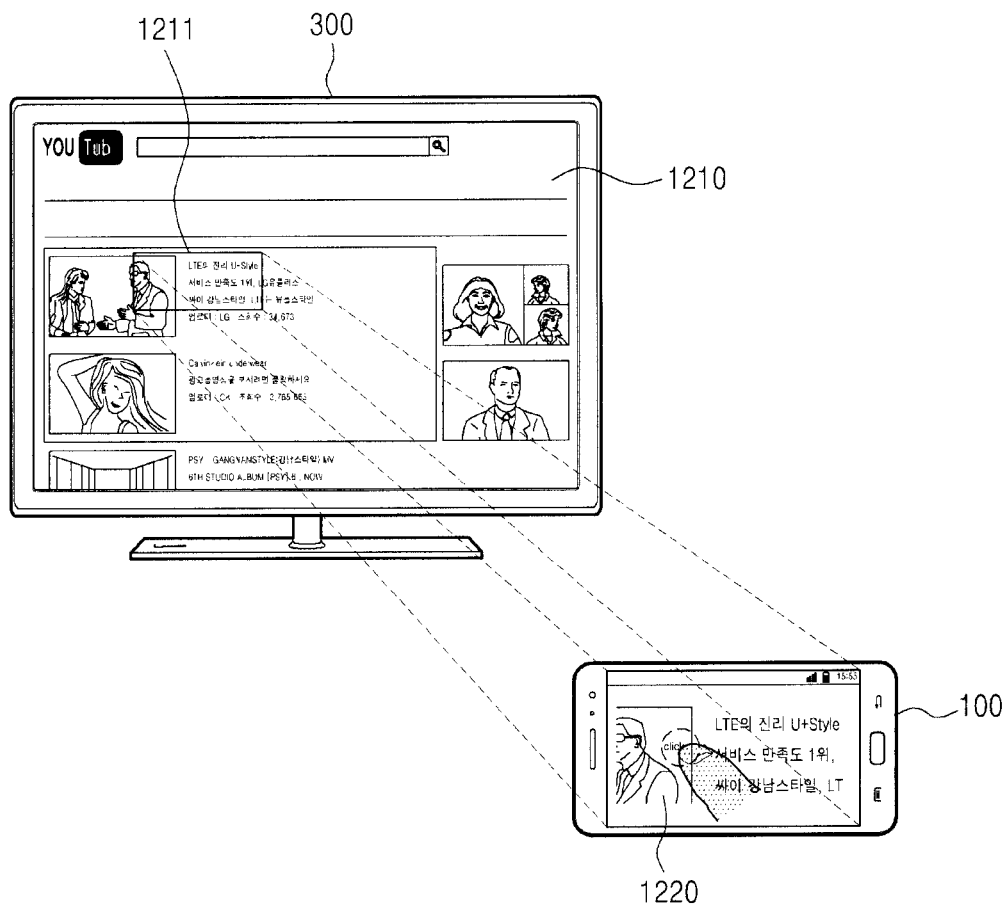
FIG. 12A and FIG. 12B illustrate an example of controlling multimedia displayed on an external device in a mobile device according to aspects of the present disclosure.
Figure 12B:
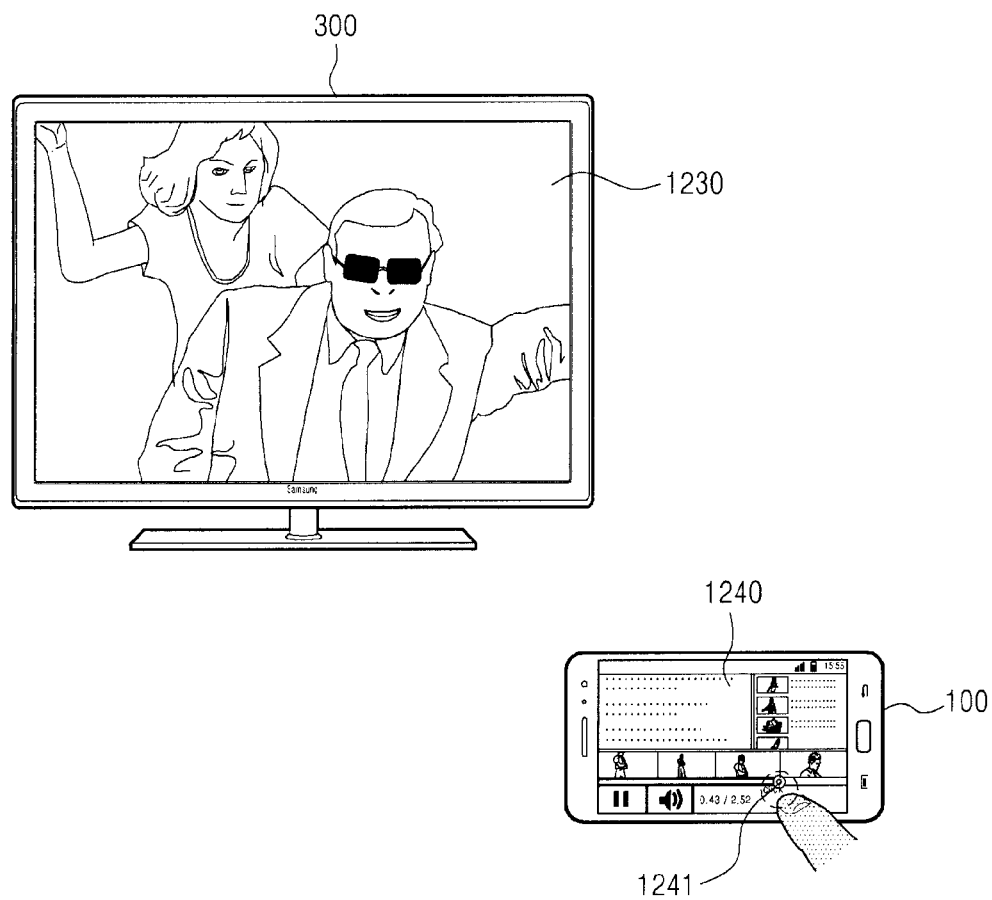

FIGS. 12A and 12B illustrate an example of controlling multimedia displayed on an external device in a mobile device according to an eighth aspect of the present disclosure.

Figure 20:
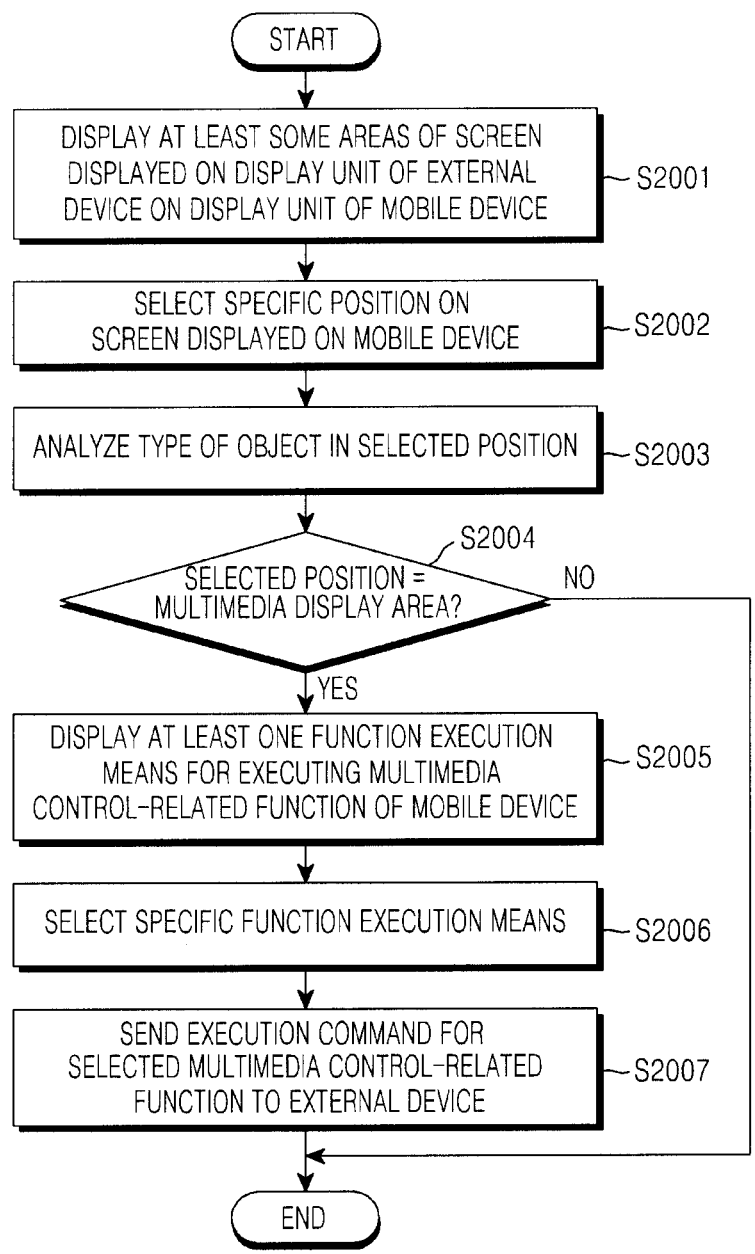
FIG. 20 is a flowchart illustrating a procedure for controlling multimedia displayed on an external device in a mobile device according to aspects of the present disclosure.

FIG. 20 is a flowchart illustrating a procedure for controlling multimedia displayed on an external device in a mobile device according to the eighth aspect of the present disclosure.

As illustrated, in accordance with aspects of the present disclosure, if a multimedia file included in a web page displayed on a screen 1210 of the external device 300 is executed through the mobile device 100, the multimedia file may be played on the screen 1210 of the external device 300, and a screen 1220 of the mobile device 100 may be switched to a screen for controlling the multimedia file and/or a screen for providing additional information.

Referring to FIGS. 12 and 20, at least some areas 1211 of a full screen 1210 displayed on the display unit (or a screen) of the external device 300 may be displayed on the display unit (for example, a touch screen) 1220 of the mobile device 100 (S2001).

In accordance with an aspect of the present disclosure, if the user makes a first gesture (for example, a gesture of touching a specific position) on the mobile device 100, at least one function related to the screen displayed on the mobile device 100 may be performed.

In other words, if a specific position is selected on the screen displayed on the mobile device 100 by the user's input (for example, a specific gesture) (S2002), a type of an object in the selected position may be analyzed (S2003). As a result of the analysis, as illustrated in FIG. 12A, if the selected position corresponds to a multimedia file area 1211 in the full screen 1210 of the external device 300 (S2004), a screen 1240 capable of controlling a multimedia file may be displayed on the display unit (for example, a touch screen) of the mobile device 100 as illustrated in FIG. 12B (S2005). At the same time, in the external device 300, as the multimedia file is selected, the selected multimedia file may be displayed on the screen 1230 of the external device 300 as illustrated in FIG. 12B. Although it is assumed in FIG. 12B that the multimedia file is played on the full screen, the multimedia file may be implemented to be played in at least some areas of the screen.

If the user selects a specific function (for example, playback, pause, volume-up/down, full screen, and the like) related to control of a multimedia file on the screen capable of controlling the multimedia file displayed on the mobile device 100 (S2006), an execution command related to the selected multimedia control function may be sent to the external device 300 (S2007). In response to the execution command, the external device 300 may control the multimedia file. Accordingly, the mobile device 100 may control playback of the multimedia file which is played in the external device 300.

In other words, as illustrated in FIGS. 12A and 12B, in accordance with aspects of the present disclosure, if video is played on the full screen of the external device 300 (for example, a TV) as playback of video included in a web page is selected, the people's comments or recommendation lists with respect to the video may be displayed on the screen of the mobile device 100 (for example, a smart phone). As illustrated in FIG. 12B, a playback-related button for controlling the video, a scroll bar, a snapshot list and the like may be provided on the screen of the mobile device 100, making it possible to control the video being played in the TV by using the mobile phone.

In the video-related control functions, as a TV plays video, the TV may notify a smart phone of its playback, and upon receiving the notification, the smart phone may display the control screen. The control function displayed on the smart phone may be implemented by connecting the video-related information to the control function screen that is implemented in the smart phone by default. Thereafter, in accordance with aspects of the present disclosure, if the video being played in the TV is interrupted, the screen of the smart phone may return back to the screen that displays some of the web page originally displayed on the TV, on the mobile device.

So far, the methods according to various aspects of the present disclosure have been described with reference to FIGS. 1 to 20. It should be noted that FIGS. 1-20 have been provided as examples. At least some of the tasks presented with respect to those figures may be performed concurrently, in a different order, or altogether omitted. Furthermore, any of the tasks discussed with respect to FIGS. 1-20 may be performed by a processor or any other suitable type of processing circuitry. Although the execution means discussed throughout the disclosure include an icon or a list, it should be noted that any other suitable user interface components may be used as execution means. Any of the user interface components may be activated (or actuated) by a user's touch, a touch by a stylus, a press of a button, a mouse click, and or any other suitable type of user input.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the disclosure has been shown and described with reference to certain examples thereof, it will be understood by those skilled in the art that various changes in form and details may be made therein without departing from the spirit and scope of the disclosure as defined by the appended claims and their equivalents.

What is claimed is:

1. A method for executing a function related to information on a first electronic device with a second electronic device, comprising:
    displaying at least a portion of a screen displayed on a display unit of the first electronic device on a display unit of the second electronic device;
    performing an analysis of an object included in the displayed portion from the first electronic device, the analysis being performed in response to a user input received at the second electronic device;

when the object is analyzed as a phone number, displaying by the second electronic device, in addition to the portion of the screen displayed on the display unit of the first electronic device, an interface for performing a plurality of phone number-related functions while the another electronic device continues to display the screen, wherein the plurality of phone number-related functions include a function to make a phone call and a function that stores the phone number, receiving a selection of the function to make the phone call and, in response, displaying information on the display unit of the second electronic device for display during the phone call while different information is displayed on the display unit of the first electronic device that is both related to the phone number and different from the screen displayed on the display unit of the first electronic device; and receiving a selection of the function that stores the phone number and, in response, storing the phone number in an address book.

2. An electronic device for executing a function related to information displayed on another electronic device, comprising:

a display unit configured to display at least a portion of a screen displayed on a display unit of the another electronic device; and a controller configured to:

perform an analysis of an object included in the displayed screen portion from the electronic device, in response to a user input;

when the object is analyzed as a phone number, the display unit displays, in addition to the portion of the screen displayed on the display unit of the another electronic device, an interface for performing a plurality of phone number-related functions while the another electronic device continues to display the screen, wherein the plurality of phone number-related functions include a function to make a phone call and a function that stores the phone number, in response to receiving a selection of the function to make the phone call, displaying information on the electronic device for display during the phone call while different information is displayed on the another electronic device that is both related to the phone number and different from the screen displayed on a display unit of the another electronic device; and in response to receiving a selection of the function that stores the phone number, storing the phone number in an address book.

3. The method of claim 1, wherein the at least one phone number-related function comprises calling the phone number responsive to receiving a user input.

* * * * *